(12) United States Patent
Mohsenian

(10) Patent No.: US 6,278,735 B1
(45) Date of Patent: Aug. 21, 2001

(54) REAL-TIME SINGLE PASS VARIABLE BIT RATE CONTROL STRATEGY AND ENCODER

(75) Inventor: Nader Mohsenian, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/044,642

(22) Filed: Mar. 19, 1998

(51) Int. Cl.[7] .................................................. H04B 1/66
(52) U.S. Cl. ............................................................ 375/240
(58) Field of Search ..................................... 348/403, 404, 348/405, 409, 419, 384, 390, 500; 382/232, 239; 375/240.01, 240.12, 241, 240.23, 240; 358/133; 341/67; H04B 1/66

(56) References Cited

U.S. PATENT DOCUMENTS

| | | | |
|---|---|---|---|
| 5,134,476 | * 7/1992 | Aravind et al. | 358/133 |
| 5,231,484 | 7/1993 | Gonzales et al. | 358/133 |
| 5,241,383 | 8/1993 | Chen et al. | 358/136 |
| 5,426,463 | 6/1995 | Reininger et al. | 348/405 |
| 5,539,469 | * 7/1996 | Jung | 348/413 |
| 5,566,208 | 10/1996 | Balakrishnan | 375/240 |
| 5,606,369 | 2/1997 | Keesman et al. | 348/385 |
| 5,631,644 | * 5/1997 | Katata et al. | 341/67 |
| 5,675,384 | 10/1997 | Ramamurthy et al. | 348/405 |
| 5,680,483 | * 10/1997 | Tranchard | 382/239 |
| 5,682,204 | 10/1997 | Uz et al. | 348/409 |
| 5,703,646 | 12/1997 | Oda | 348/401 |
| 5,703,889 | 12/1997 | Shimoda et al. | 371/55 |
| 5,715,176 | 2/1998 | Mobini | 364/514 R |
| 5,748,243 | * 5/1998 | Suzuki | 348/405 |
| 5,754,233 | * 5/1998 | Takashima | 348/390 |
| 5,764,698 | * 6/1998 | Sudharsanan et al. | 375/241 |
| 5,764,805 | * 6/1998 | Martucci et al. | 382/238 |
| 5,874,995 | * 2/1999 | Naimpally et al. | 348/384 |
| 5,877,814 | * 3/1999 | Reininger et al. | 348/500 |
| 5,956,426 | * 9/1999 | Matsuura et al. | 382/239 |
| 5,987,179 | * 11/1999 | Riek et al. | 382/236 |

FOREIGN PATENT DOCUMENTS

| | | | |
|---|---|---|---|
| 0664651A2 | 7/1995 | (EP) | H04N/7/26 |
| 753831A1 | 7/1995 | (EP) | H04N/7/26 |
| 0937242 | 2/1997 | (JP) | H04N/7/24 |
| 0970041 | 3/1997 | (JP) | H04N/7/24 |
| 0993537 | 4/1997 | (JP) | H04N/5/92 |
| 09186999 A | 7/1997 | (JP) . | |
| WO9732436 | 9/1997 | (WO) | H04N/7/50 |
| WO9743859 | 11/1997 | (WO) | H04N/7/26 |

OTHER PUBLICATIONS

Satoshi Kondo, "An Algorithm of MPEG2 Realtime Variable Bit Rate Video Coding," Technical Report of Television Society, 20 [68], pp. 45–52, Dec. 13, 1996. (Abstract).

(List continued on next page.)

Primary Examiner—Chris Kelley
Assistant Examiner—Tung Vo
(74) Attorney, Agent, or Firm—Heslin & Rothenberg, P.C.; John R. Pivnichny

(57) ABSTRACT

A real-time single pass variable bit rate control strategy is provided to achieve variable bit rate (VBR) MPEG-2 encoding in a video compression system. For a sequence of frames, the level of encoding difficulty of a video interval (i.e., a group of pictures (GOP)) is determined by a perceptual rate-quantization ($\bar{C}$-$\bar{Q}$) model. This model assigns a composite ($\bar{C}$-$\bar{Q}$) curve to each video interval from which the number of bits for the video interval is estimated. The estimation relies on a causal predictive model using the parameters obtained from previously encoded video intervals. The R-Q relationship of each picture type is updated and picture bits are assigned, based on the total rate of the video interval under analysis. Robustness of the variable bit rate control strategy is ensured throughout scene transitions and instabilities by applying, for example, a non-linear median filter, and a low pass filter, respectively.

29 Claims, 9 Drawing Sheets

OTHER PUBLICATIONS

Interface 23 [7], pp. 126–129, Jul. 1997. (Translation).

O. Verscheure, et al., "Perceptual Bit Allocation For MPEG–2 CBR Video Coding," Proceedings, International Conference on Image Processing, vol. 1, pp. 117–120, 1996 (IEEE).*

"Video Sub–Band Coder," IBM Technical Disclosure Bulletin, vol. 34, No. 7A, pp. 191–192 (Dec. 1991).

"Controlling The Trade–Off Between Reserved Bandwidth And Delay For Variable Bit Rate Multimedia Streams," IBM Technical Disclosure Bulletin, vol. 37, No. 11, pp. 127–130 (Nov. 1994).

* cited by examiner

REAL-TIME SINGLE PASS VARIABLE BIT RATE CONTROL STRATEGY AND ENCODER

TECHNICAL FIELD

This invention relates, in general, to the field of digital video compression, and in particular, to a rate-control technique suitable for real-time single-pass variable bit rate encoding in a video compression system which employs the MPEG-2 international standard.

BACKGROUND ART

The emergence of various digital video technologies in industries such as broadcast television, communications networks, consumer electronics, and multimedia computers has been increasing at a remarkable rate. This widespread use of applications is motivated by the fact that signal processing, editing and data transfer of digital information is much easier as compared to performing the same tasks with an analog representation. But more importantly, digital video owes its popularity to the several standards that have been created for digital video compression in recent years.

Digital video compression solutions are arguably the most important component of any digital video platform. Since digital video is known to contain an enormous amount of information in uncompressed format, its manipulation, storage, and transmission can become very time consuming and expensive, if not impossible. As a result, digital video compression techniques are needed to reduce the overwhelming volume of the data while preserving the perceptual quality of its content. A compatible video decompression scheme is then used to uncompress the data for playback.

The MPEG-2 international standard formed by the Moving Pictures and Expert Group, and described in ISO/IEC 13818-2, "Information technology—Generic coding of moving pictures and associated audio information: Video, 1996," which is hereby incorporated herein by reference in its entirety, is intended to satisfy the compression needs of the industries mentioned above. This standard specifies the syntax of the encoded stream and a technique of decoding. It offers great flexibility to the encoder designer allowing the designer to derive his/her own set of compression parameters, and therefore, distinguish his/her product from the rest of the encoders developed by other manufacturers.

The efficiency of the MPEG-2 encoding system is assessed by the fidelity of the perceived video transmitted over a fixed communications bandwidth or stored into a digital medium. For some applications, such as in digital satellite systems, multiple programs are multiplexed into a single large stream for broadcasting, and a bank of MPEG-2 encoders are used to monitor and encode all programs, while maintaining the quality of all received channels. The MPEG-2 stream is sent over either a fixed communications bandwidth or a dynamic bandwidth as in asynchronous transfer mode (ATM) networks. For home consumer video or PC applications, where the size of the storage media is limited, the user would like to accumulate as much information as possible, and an efficient encoder is certainly beneficial in these cases.

Most MPEG-2 encoders are developed to perform in constant bit rate (CBR) mode, where the average rate of the video stream is almost the same from start to finish. A video stream includes a plurality of pictures or frames of various types, such as I, B and P picture types. A picture, depending on its type, may consume more or less bits than the set target rate of the video stream. The CBR rate-control strategy has the responsibility of maintaining a bit ratio between the different picture types of the stream, such that the desired average bit rate is satisfied, and a high quality video sequence is displayed.

Other encoders, including other MPEG-2 encoders, perform in a different mode, defined as a variable bit rate (VBR) mode. Variable bit rate encoding allows each compressed picture to have a different amount of bits based on the complexity of intra and inter-picture characteristics. For example, the encoding of scenes with simple picture content (such as a color test pattern) will consume significantly less bits than scenes with complicated picture content (such as a crowded city street), in order to achieve the same picture quality.

Because of the amount of information that is needed to characterize the video and the complexity of the algorithms needed to interpret the information to effectively enhance the encoding process, VBR encoding is conventionally accomplished in non-real time using two or more passes. In a first pass, encoding is performed and statistics are gathered and analyzed, and in a second pass, the results of the analysis are used to control the encoding process. Although this produces a high quality compressed video stream, it does not allow for real-time operation, nor does it allow for single pass encoding.

Therefore, a need exists for a real-time, single pass variable bit rate encoding scheme that provides high quality videos. A further need exists for a real-time single pass variable bit rate encoding scheme that is easily implementable in hardware.

SUMMARY OF THE INVENTION

The shortcomings of the prior art are overcome and additional advantages are provided through the provision of a method of processing groups of frames. The method includes, for instance, encoding at least one group of frames of an input stream, and determining, prior to encoding the entire input stream, a number of bits to be allocated to another group of frames of the input stream. The another group of frames is to be encoded in a variable bit rate mode. The determining uses one or more parameter of values obtained from the encoding.

In a further embodiment of the invention, the method includes encoding the another group of frames in a single pass variable bit rate mode, wherein the another group of frames is encoded in only one encoding pass.

In yet another embodiment of the invention, the determining includes modulating, for the another group of frames, a slope of a predefined perceptual function, and using the modulated slope in a bit rate equation to determine the number of bits to be allocated.

In a further embodiment, the determining includes determining, for the another group of frames, a translation factor for a predefined perceptual function, and using the translation factor in a bit rate equation to determine the number of bits.

In yet another embodiment of the invention, the determining includes compensating for one or more instability conditions of the input stream, and in a further embodiment, the determining includes using a predefined function to determine the number of bits.

In yet another aspect of the invention, a method of processing groups of frames is provided. The method includes, for example, determining a plurality of parameter values from one or more previously encoded group of frames; computing, for a group of frames to be encoded, in a single pass variable bit rate mode, a slope of a predefined function, in which the computing uses one or more of the plurality of parameter values; and obtaining a bit rate for the group of frames to be encoded, using the computed slope and one or more of the plurality of parameter values.

In another aspect of the present invention, a method of processing groups of frames is provided. The method includes, for instance, determining a number of bits to be allocated to a group of frames of an input stream. The determining uses an instantaneous rate-quantization behavior of the group of frames and a perceptual model indicating a complexity of the group of frames. The method further includes encoding the group of frames using a variable bit rate mode at a rate defined by the determining.

In another aspect of the invention, a single pass variable bit rate encoder is provided. The encoder includes, for example, an encoding engine adapted to encode at least one group of frames of an input stream; and means for determining, prior to encoding the entire input stream, a number of bits to be allocated to another group of frames of the input stream. The another group of frames is to be encoded in a variable bit rate mode. The means for determining uses one or more parameter values obtained from the encoding engine.

In yet another aspect of the present invention, a single pass variable bit rate encoder is provided, which includes, for instance, means for determining a plurality of parameter values for one or more previously encoded group of frames; means for computing, for a group of frames to be encoded in a single pass variable bit rate mode, a slope of a predefined function, in which one or more of the plurality of parameter values is used; and means for obtaining a bit rate for the group of frames to be encoded, using the computed slope and one or more of the plurality of parameter values.

In yet a further embodiment of the present invention, a single pass variable bit rate encoder is provided, which includes, for instance, means for determining a number of bits to be allocated to a group of frames of an input stream, in which the means for determining uses an instantaneous rate-quantization behavior of the group of frames and a perceptual model indicating a complexity of the group of frames; and an encoding engine adapted to encode the group of frames using a variable bit rate mode at a rate defined by the means for determining.

The present invention is particularly useful for applications where one cannot pre-analyze or pre-encode the video, as in in-home production for digital video disks (DVD's), digital video cassette recorders (DVCR's), computer multimedia, and digital camcorders. A single-pass VBR encoder only uses the previously encoded pictures to make an assumption about the complexity of a picture to be encoded. This is in contrast to multi-pass VBR video compression, used in high-end DVD mastering, where a video source may be pre-analyzed and encoded several times to create an optimal compressed stream for a particular storage medium. Therefore, a single-pass VBR encoder relies on a causal predictive model to dynamically adjust the average rate of the stream and produce high fidelity video.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a rate-control strategy for real-time single pass variable bit rate (VBR) encoding is provided, which is easily implementable in hardware and may be incorporated in, for instance, any MPEG-2 compression system.

Figure 1:
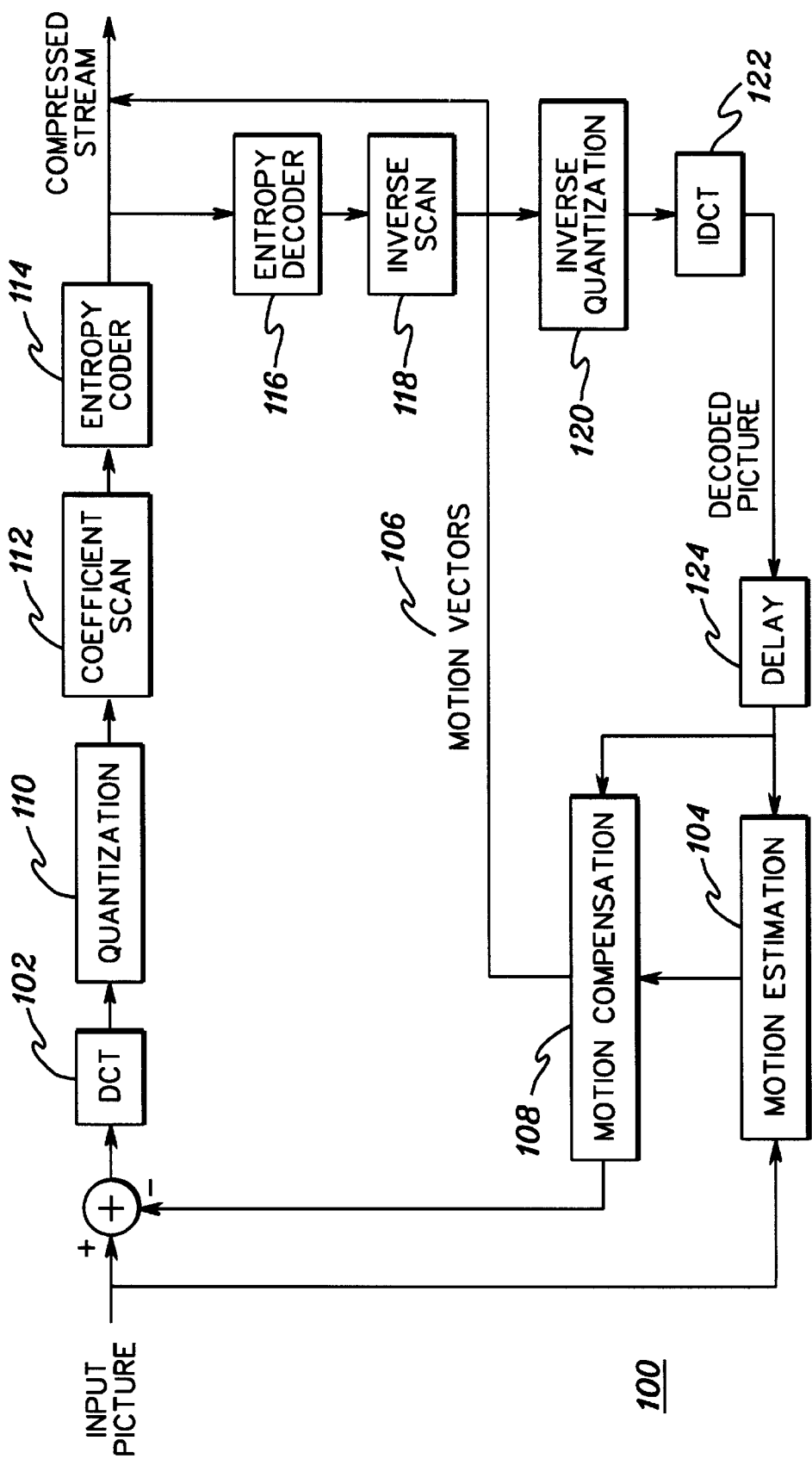
FIG. 1 depicts one example of a block diagram of an MPEG-2 encoder incorporating and using the real-time single pass variable bit rate control strategy of the present invention.

One example of a block diagram of an MPEG-2 encoder 100 is shown in FIG. 1. In particular, FIG. 1 depicts various image and signal processing tasks used by the encoder to encode a video stream and to decode the compressed stream.

MPEG-2 encoder 100 is a sophisticated information processor including spatial and temporal image analyzers, quantizers, entropy coders, and a rate control policy that ensures the creation of a fully compliant video stream which meets the demand of a chosen application. Each luminance picture of a video stream is partitioned into non-overlapping blocks of 16×16 pixels, which in turn are sub-divided into four 8×8 blocks. The two chrominance pictures result in four or two 8×8 blocks, depending on the 4:2:2: or 4:2:0 chrominance sampling. The set containing all luminance and chrominance blocks is called a macroblock (MB). A 4:2:2 macroblock has eight blocks, while the 4:2:0 macroblock has six. Each 8×8 block of pixels is transformed to frequency domain, using a two-dimensional discrete cosine transformation (DCT) 102. DCT is intended to perform an energy compaction on input blocks by obtaining classes of high priority (low) frequency coefficients and low priority (high) frequency coefficients. It is a fast and efficient way of removing some of the spatial redundancies of the image blocks.

Temporal redundancies are removed via a technique called motion estimation (ME) 104. With this scheme, any luminance macroblock can be predicted by moving a correspondent macroblock, which belongs to a previous picture, within a search window. The procedure of searching for the best macroblock match is defined as motion estimation. This best match (prediction) is then subtracted from the macroblock under consideration and a DCT transformation is applied to the macroblock difference. Further, a motion vector 106 is created, which points to the location of the predicted macroblock. The motion vector (MV) is used by both the encoder and the decoder to motion compensate (MC) 108 the correspondent macroblock and locate the best match.

Motion estimation is implemented only on the luminance portion of the macroblock, with the resulting motion vector scaled and used to motion compensate the chrominance block pairs. The encoding of the motion vectors is carried out, employing a technique known as differential pulse code modulation (DPCM), where a motion vector is predicted using the motion vector of a previously encoded macroblock, and only the difference between the motion vector and its prediction is encoded. Motion vector differences are represented with code words defined in look-up tables of the MPEG-2 standard.

Figure 2:
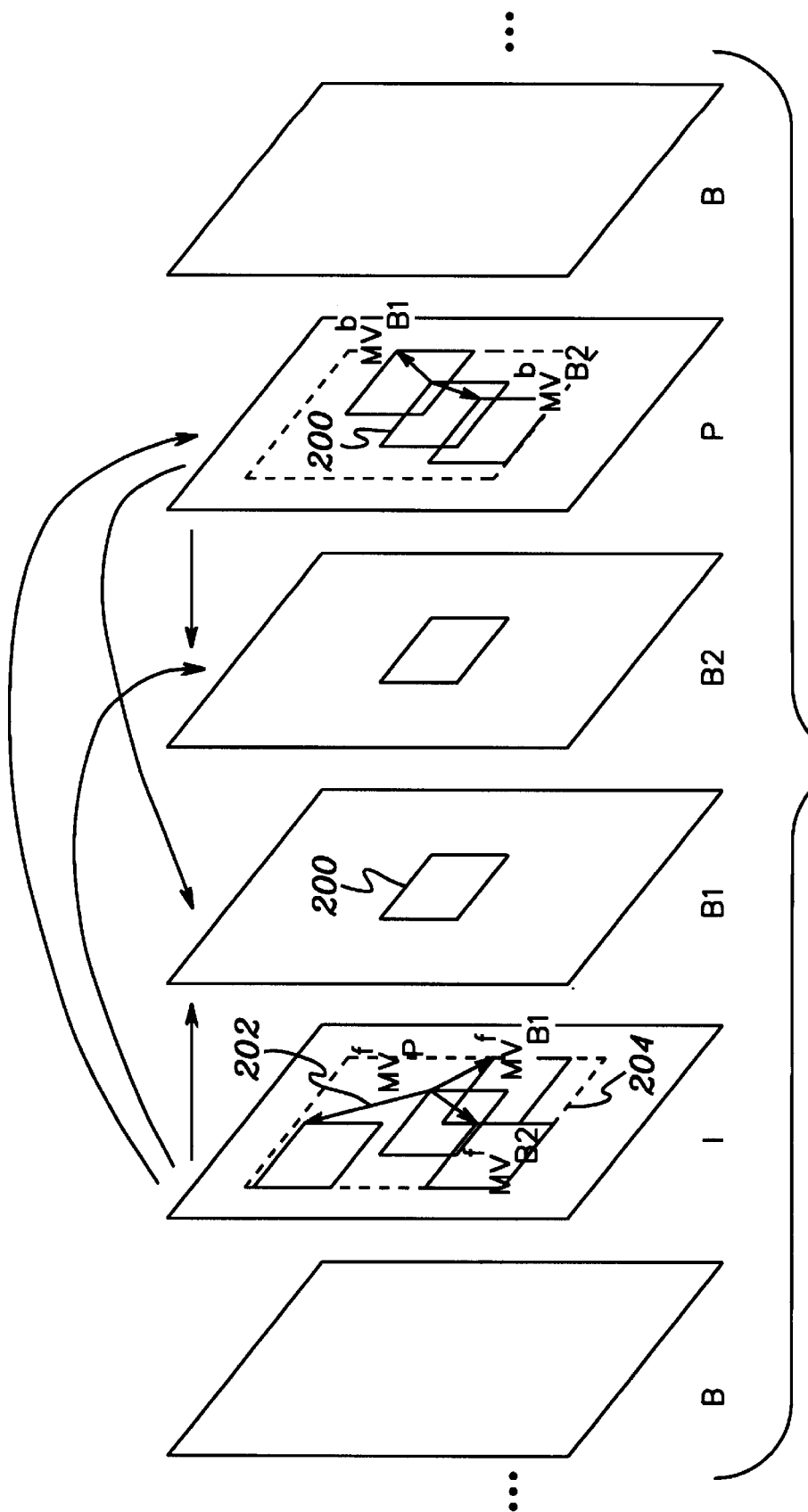
FIG. 2 depicts one example of a block diagram of motion estimation tasks for P and B picture types.

The MPEG-2 standard uses I (Intra-Coded), P (Predicted) and B (Bidirectionally-Predicted) type pictures, as shown in FIG. 2. The Intra-Coded I's use only the information within that picture, while the P types employ the motion estimation and compensation tasks performed on previously encoded I or P types to predict a macroblock 200 and compute a prediction error to be encoded. This is an efficient way of compression, since the motion compensated macroblock differences contain less information than the original macroblock.

P types are often called forward predicted pictures, since they use previous pictures to make predictions forward in time. For example, in FIG. 2, a motion vector $MV_p^f$ 202 is used to find the best match for a macroblock 200 in picture P, which resides in picture I and within a search window 204 (denoted in FIG. 2 by the dashed lines).

B type pictures use information from both previous and future I or P types for forward and backward predictions and are particularly useful for estimating objects that move in different directions with different velocities. Further, the bidirectional motion estimation schemes used in B pictures are more robust in noisy environments, as compared to the causal prediction used for P types. This is because both predictions can be used simultaneously by averaging their nominal values. In the example of FIG. 2, the task of motion estimation for macroblock 200 in picture B1 consists of a forward prediction represented by $MV_{B1}^f$ and a backward prediction, represented by $MV_{B1}^b$. For picture B2, forward and backward predictions are represented by $MV_{B2}^f$ and $MV_{B2}^b$, respectively.

The various picture types are quantized 110 (FIG. 1) by encoder 100 in several steps. First, a quantization matrix, unique to a picture type, is applied to an 8×8 DCT block. The elements (weights) of the matrix are chosen such that importance is given to low frequency coefficients. These coefficients contain more information and contribute more to the perceptual quality of the picture. Then, a quantization scaling factor is computed to classify the macroblocks into different classes, based on the local image activity, complexity of the picture type, and a measure of buffer fullness. This index is directly related to the number of bits allocated to a picture and its perceived quality. The actual number of bits is obtained by first scanning 112 each DCT block and then grouping the quantized alternate current (AC) coefficients together, according to the procedures defined in the MPEG-2 standard. Each group is entropy coded 114 with a unique variable length code (VLC), using a Huffman lookup table. Direct current (DC) coefficients are encoded, employing DPCM (similar to encoding of MV's) and uniform quantization.

The output of the entropy coder 114 is input to entropy decoder 116. The output of decoder 116 goes through an inverse scan 118, inverse quantization 120 and inverse discrete cosine transformation 122 to return a lossy version of the difference macroblock. The decoded picture is then passed through a delay 124 to motion estimation 104 and/or motion compensation 108, as is known in the art.

Since the instantaneous rate of the compressed stream changes over time, a decoder buffer is used to absorb the rate fluctuations and convert the fixed channel rate into compressed picture bits and deliver it to an actual decoder for processing. Therefore, in one embodiment of the rate-control strategy of the present invention, the level of buffer occupancy is tracked, as well as the complexity of the picture and the local activity of the image macroblock, as described in detail below.

Encoder 100 further includes a rate control policy used in the creation of a fully compliant stream that meets the demand of a chosen application. In accordance with the principles of the present invention, the rate control policy of encoder 100 includes a variable bit rate (VBR) encoding scheme used to encode the frames of an input stream (e.g., a video stream). However, before discussing the VBR encoding scheme of the present invention, some rate control fundamentals are discussed in order to enhance the understanding of the present invention. These fundamentals relate to constant bit rate (CBR) encoding schemes.

1. CBR Rate Control Fundamentals

An MPEG-2 sequence is typically partitioned into small intervals, such as group of pictures (GOP's) or frames, which in turn are categorized by picture types I, P, and B. The number of bits per GOP is distributed such that an I picture allocation is more than a P. This is because a P picture uses the motion estimation technique to estimate its content and, as a result, a motion compensated frame difference (MCFD), with a lower entropy than the original source, is encoded. B pictures use the least amount of bits, since their motion estimation techniques are more intensive than P's. This provides a basis for maintaining the same picture quality within a GOP, when pictures of different types are encoded. Further, the bit allocation of B pictures can be lowered, since they will not be used to estimate other pictures. An encoded GOP starts with an I picture type. The amount of bits assigned to a picture type $x, (x \in \{I,P,B\})$ is inversely related to the amount of distortion perceived in the picture quality of that type.

Experimental results in the literature (i.e., J. L. Mitchell, W. B. Pennebaker, C. E. Fogg, and D. J. LeGall, *Mpeg Video Compression Standard,* Chapman and Hall, New York, 1997, which is hereby incorporated herein by reference in its entirety) suggest that a similar behavior exists between the rate R of the source (or picture or frame) and the quantization factor Q, which in simplified form becomes:

$$R^x(Q^x) = \frac{X^x}{Q^x}, \quad (1)$$

where $X^x$ is a pre-defined measure of complexity for each picture type.

However, since the nature of the source changes over time, a new complexity measure is determined prior to encoding of each picture type. This parameter is usually computed based on the past encoding parameters, e.g., bits, quantization factor, and/or some look-ahead statistics. For each GOP of an MPEG-2 stream, a number of bits given by $C_k$ is enforced:

$$\sum_x N^x R^x = C_k \quad x = I, P, B, \quad (2)$$

where index k denotes the GOP number, x is the picture type, $N^x$ is the number of pictures of type x in a GOP and $R^x$ is the target picture bits for type x.

For a CBR sequence, $C_k = C_{gop}$, where $C_{gop}$ is a fixed GOP bits. For a given $C_k$, the video quality of the GOP is maximized by minimizing the average sum of the quantization scalers subject to the condition of equation (2), $$\Psi = \frac{\sum_x N^x Q^x}{\sum_x N^x}. \quad (3)$$

Instead of minimizing $\Psi$ subject to the constraint of (2), this condition is removed and the Lagrange multiplier $\lambda$ is used to minimize the Lagrangian cost Y:

$$Y = \Psi - \lambda C_k \quad (4)$$

With the aid of the rate-quantization model described in (1), the target bits for each picture type is deduced:

$$R^x = \frac{X^x C_k}{\sum_x X^x N^x}. \quad (5)$$

Targets in equation (5) represent the ideal picture bits and the actual bits would almost always deviate from this. The accumulated error is computed and fed back to the constant bit rate control technique to ensure that the final MPEG-2 bitstream meets the average bit rate or the total bit budget. Let $C_{k,ideal}$ and $C_{k,actual}$ represent the ideal and actual bits for GOP k, respectively, and $\delta_{k,gop} = C_{k,actual} - C_{k,ideal}$ be the difference between the two. Further, let $R_{i,ideal}$ and $R_{i,actual}$ represent the ideal and actual bits for picture i, respectively, and $\delta_{i,pic} = R_{i,actual} - R_{i,ideal}$ be the difference between the two. After n number of pictures have been encoded, the total accumulated error can be computed as:

$$\sum_{k=0}^{n_g-1} \delta_{k,gop} + \sum_{i=0}^{n-n_g G-1} \delta_{i,pic} = \Delta_{n-1,gop} + \Delta_{n-1,pic}. \quad (6)$$

The size of the GOP is given by $$G = \sum_x N^x, \text{ and } n_g = \left\lfloor \frac{n}{G} \right\rfloor$$

is the number of encoded GOP's. Sub-error accumulation for all processed GOP's is given by $\Delta_{n-1,gop}$, while $\Delta_{n-1,pic}$ is the sub-error accumulation for the last, but not yet finished GOP in the encoding order. The ideal picture target can now be adjusted for overproduction or underproduction of bits, resulting from previously encoded pictures. The new ideal bits prior to encoding picture n belonging to GOP ($k=n_g$) is:

$$R^x_{n,ideal} = \frac{X^x_{n-1}(C_{gop} - \alpha \Delta_{n-1})}{\sum_x X^x_{n-1} N^x}, \quad (7)$$

where $C_{gop}$ is a fixed number of CBR GOP bits; $\alpha$ is, for example, 1.0; and $\Delta_{n-1} = \Delta_{n-1,gop} + \Delta_{n-1,pic}$. $\alpha$ is a constant that indicates how aggressively this adjustment is carried out. After each picture is encoded, complexity measures $X^x$'s are updated and a new target based on equation (7) is computed for the next picture. This target should meet certain constraints, as described below, to ensure that the decoder buffer does not experience overflow or underflow conditions.

Finally, a quantization scaler Q, which is defined on the hyperbola of equation (1), is obtained. It should be noted that each picture type has its own composite (R-Q) curve, and further, for each picture type, the Q factor may slightly get adjusted to assure all frames are perceived equally. The manner in which perceptual effects for macroblock-level rate control are incorporated, as well as how the ideal targets are met during the encoding task via modulating the Q factor, are not described herein. They are, however, described in ISO/IEC JTC1/SC29/WG11/N0400, "Test Model 5," April 1993, which is hereby incorporated herein by reference in its entirety.

Described above is a description of various CBR fundamentals. Following, is a description of VBR and, in particular, the real-time single pass VBR techniques of the present invention.

2. VBR Video

The CBR rate control technique of section 1, is motivated by the fact that for a fixed target $C_{gop}$, constant quality is achieved within a GOP by modulating the quantization parameters. Any statistical variations or bit offshoots are exploited to help stabilize the CBR rate control technique over time and maintain a desired rate. In addition, an MPEG-2 CBR encoder takes advantage of a set of universal constants and pre-determined initial complexity measures to maintain a certain ratio between the amount of bits allocated among different picture types. However, efforts in classifying a group of continuous pictures, such as GOP's or video segments, into different types of time intervals, in terms of complexity hardness or softness, have been limited for real-time single-pass MPEG-2 encoding. Hardness (softness) of the video is defined by a large (small) amount of bits that it requires to produce high fidelity results. For multi-pass CBR or multi-pass VBR encoding, such information is known and hence, quality improvements can be made.

In this invention, however, a level of complexity is added to the rate-control strategy of CBR encoding by adjusting the GOP bits on the fly. This problem is particularly challenging, since the statistical nature of any video source is either not known a priori or will change over time, and a true estimation of source distribution can become impossible. The real time single-pass VBR encoder of the present invention exploits a ($\overline{C}$-$\overline{Q}$) perceptual model to differentiate the hardness or softness of video segments, each corresponding to a particular hyperbola defined by equation (1). The actual ($\overline{C}$,$\overline{Q}$) pairs are then computed along this hyperbola.

2.1 Rate-Quantization Perceptual Model

The VBR scheme of the present invention is conceptually motivated by the fact that each video segment (i.e., each GOP) is associated with a level of encoding difficulty, and this difficulty can be measured by various source statistics or compression parameters, such as total picture bits, quantization scaler, spatial activity, temporal activity, signal to noise ratio, or any combination of the above. A larger amount of bits should be allocated to a video segment with a high level of encoding difficulty. This is a different approach than the CBR rate control technique, where a fixed number of bits is allocated to each GOP, regardless of the degree of complexity of the source. Research efforts have shown that for a large number of test cases composed of complex, moderate and easy materials, a strong correlation exists between the rate of the video interval and the quantization scaler. This correlation is described, for instance, in co-pending U.S. Patent Application entitled "Two-Pass Encoding Method Of Digital Motion Video Sequences For Constant Or Variable Rate," R. Rajagopalan et al., Ser. No. 09/013,149, filed Jan. 26, 1998, which is hereby incorporated herein by reference in its entirety.

In particular, this correlation is shown by the following equation:

$$R_a \alpha (a_1 + a_2 Q_a^\beta) \qquad (8),$$

where $a_1$ is a point 300 (FIG. 3) at which a perceptual line 301 intercepts a $\overline{C}$ axis 302 (e.g., $a_1$=0.2); $a_2$ is the slope of perceptual line 301 (e.g., $a_2$=0.06), and β indicates whether the perceptual model is linear or non-linear (e.g., β=1 indicates linear).

The $R_a$-$Q_a$ relationship of (8) is deduced based on the criterion that all types of video intervals should be perceived equally. Further, it suggests that difficult video segments producing a large quantization scaler, Q, should consume more than an average bit rate of the compressed stream, while easy segments would use a smaller number of bits. This relationship provides a building block in formulating a robust single pass VBR encoding technique, since it takes advantage of the variability of the video source.

Using the above relationship, the actual number of bits allocated to each interval (e.g., each GOP) is determined, in accordance with the principles of the present invention, by the slope K of the following perceptual model:

$$R_a = K(a_1 + a_2 Q_a^\beta) \qquad (9).$$

In particular, in accordance with one technique of the present invention, constant K (measured in Mbits/s) is modulated, for each video interval (i.e., each GOP), to ensure the average rate of the compressed stream meets the desired target rate. One technique for modulating K is described further below.

2.2 VBR Rate Control Technique 1

The efficiency of a single pass VBR encoder is assessed by how fast its rate control technique can learn and adjust itself to the softness or hardness of the video stream. For regions where image discontinuity or special effects occur, degradations in picture quality should be minimized. Since, for single pass encoding, image statistics are limited by the previously analyzed and encoded pictures, the learning rate of the rate control technique should be adequate enough to predict the content of the future video intervals, yet not be too aggressive to result in algorithmic instabilities. One way to solve the twofold problem is to adjust the quality of the encoded stream for every time interval (i.e., every GOP) and let the rate control technique learn the local content of each picture within that time interval.

In accordance with the principles of the present invention, a VBR input stream $S_{vbr}$ is, for instance, a concatenation of several contiguous video or time intervals (i.e., GOP's), each operating at a different CBR bit rate. Dynamic bit rate adjustment for each video interval is determined by the perceptual model described in section 2.1, while the actual ($\overline{C}$,$\overline{Q}$) pairs are computed from the rate-quantization model of equation (1). Therefore, VBR sequence $S_{vbr}$ can be partitioned into a finite number of GOP's specified by $\{S_k\}^m_{k=0}$. For GOP $S_k$, an average number of bits, $\overline{C}_k$, and an average quantization scalar, $\overline{Q}_k$ are defined, such that $[\overline{C}_k \overline{Q}_k]=G^{-1}[C_k Q_k]$. The terms of equation (9) are modified, in accordance with the principles of the present invention, to form a dependency between the average bits and quantization scaler of GOP $S_k$, as follows: $\overline{C}_k = f^{-1} K F(\overline{Q}_k)$ (equation 9a), in which the frame rate of the video is defined by f.

Let ($\overline{C}_{k-2\ actual}, \overline{Q}_{k-2, actual}$) and ($\overline{C}_{k-1, actual}, \overline{Q}_{k-1, actual}$) represent the average bits and average quantization scaler pairs of GOP's $S_{k-2}$ and $S_{k-1}$ just encoded. A CBR or VBR MPEG-2 encoder can be used for the encoding of those GOP's. Further, it is assumed that there is a hyperbolic dependency between $\overline{C}_k$ and $\overline{Q}_k$ as in equation (1), and that the above pairs are used, in the present invention, to predict a linear model for the $\overline{C}$-$\overline{Q}$ relationship, as follows:

$$\overline{C}_k = -\xi_k \overline{Q}_k + \eta_k$$

where, $$\begin{cases} \xi_k = \dfrac{\Delta \overline{C}_k}{\Delta \overline{Q}_k} & \eta_k = \overline{C}_{k-1,actual} + \xi_k \overline{Q}_{k-1,actual} \\ \Delta \overline{C}_k = \overline{C}_{k-1,actual} - \overline{C}_{k-2,actual} & \Delta \overline{Q}_k = \overline{Q}_{k-2,actual} - \overline{Q}_{k-1,actual} \end{cases} \qquad (10)$$

Figure 3:
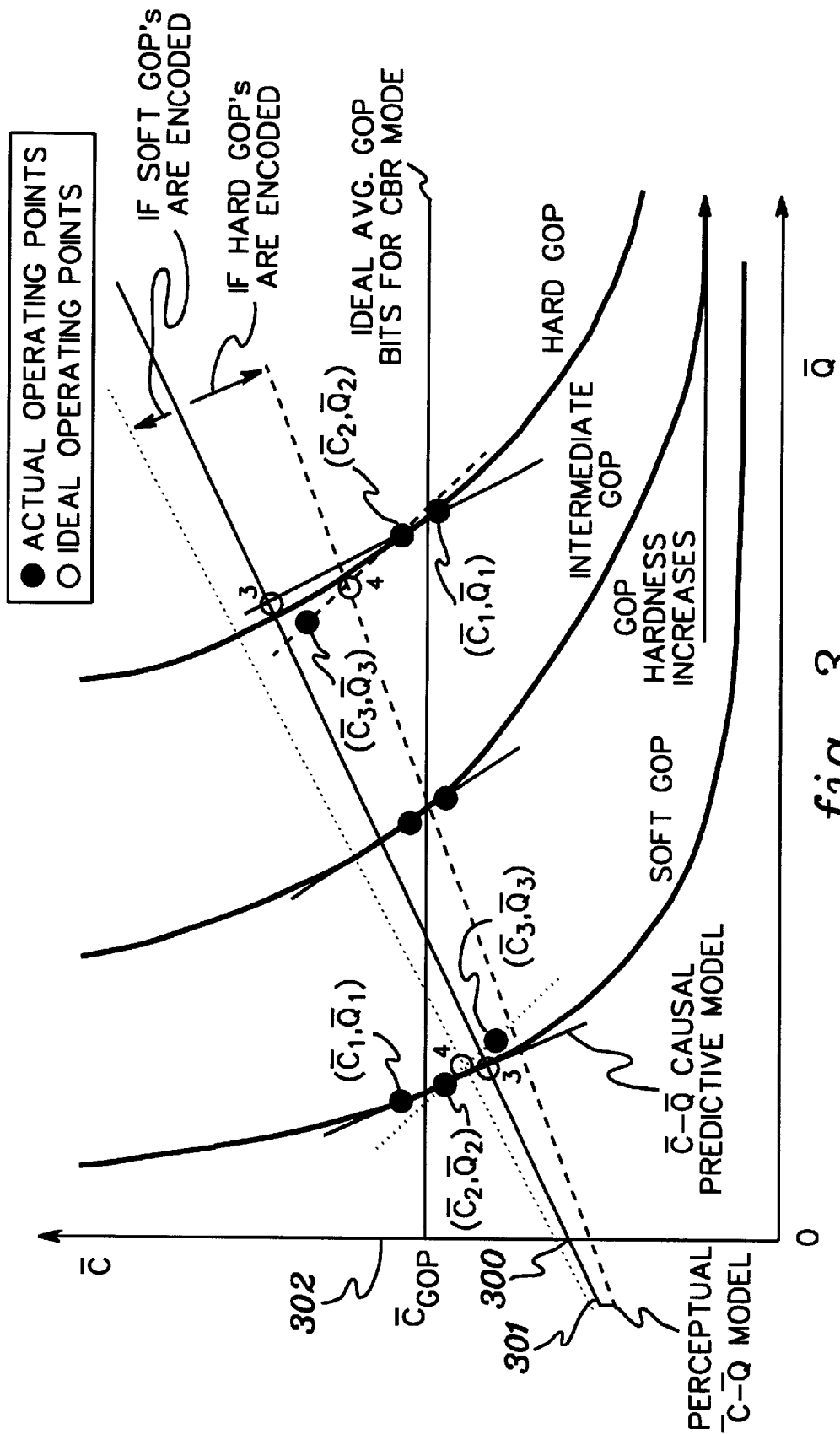
FIG. 3 depicts one example of the $\overline{C}$-$\overline{Q}$ models and the operating points of a variable bit rate control technique of the present invention.

Equation (10) defines the instantaneous rate-quantization behavior of a particular GOP under analysis. The linear model of equation (10) and its relationship to the perceptual model of equation (9a) are depicted in FIG. 3.

To find the optimum operating point, equation (10) is solved together with the perceptual model of equation (9a). For example, ideal operating point 3 is obtained from solving the equations with ($\overline{C}_1, \overline{Q}_1$) and ($\overline{C}_2, \overline{Q}_2$), and ideal operating point 4 is obtained from solving the equations with ($\overline{C}_2, \overline{Q}_2$) and ($\overline{C}_3, \overline{Q}_3$).

In particular, a next GOP is encoded at the average bits of:

$$\overline{C}_k = \frac{K(\xi_k a_1 + \eta_k a_2)}{f \xi_k + a_2 K}. \qquad (11)$$

Constant K is modulated for each GOP to ensure that the total number of bits produced by the VBR stream is not more than the size of the storage or retrieval device, e.g., a DVD disk. For instance, if the total number of bits available is $R_{TOT}$, then after every GOP of the input sequence is analyzed and encoded, the perceptual model of (9a) can be used to compute K, as follows:

$$K = \frac{fR_{TOT}}{G \sum_{k=0}^{N_{gop}-1} F(\overline{Q}_{k,actual})}, \quad (12)$$

where $N_{gop}$ is the number of GOP's in the input sequence and G is the GOP size.

The denominator of equation (12) can be easily computed in a multi-pass encoding scheme, but is not available for a single-pass real-time compression scheme, as in the present invention. Thus, in accordance with the principles of the present invention, a pre-encoded phantom sequence is used, instead, with a set of GOP quantizers defined by:

$$\{\overline{Q}_k^*\}_{k=0}^{N^*_{gop}-1},$$

where $N^*_{gop}$ is the number of encoded GOP's in the phantom sequence. The summation of equation (12) is thus adjusted after each GOP of the input sequence is encoded.

Given a number of pictures and a bit budget $R_{TOT}$, the single pass VBR encoder of the present invention has the responsibility of fitting all of the produced bits into the digital medium. In order to prevent over-runs or under-runs, $R_{TOT}$ is dynamically modified for each GOP. The adjusted budget $R_{k,tot}$ is obtained by subtracting the actual bits from $R_{TOT}$ and is used to set a new slope, $$K_k = \frac{fR_{k,tot}}{G \sum_{k=0}^{N_{gop}-1} F(\overline{Q}_{k,actual})}. \quad (13)$$

FIG. 3 displays how the perceptual model is adjusted for cases where soft or hard GOP's are encoded.

Figure 4:
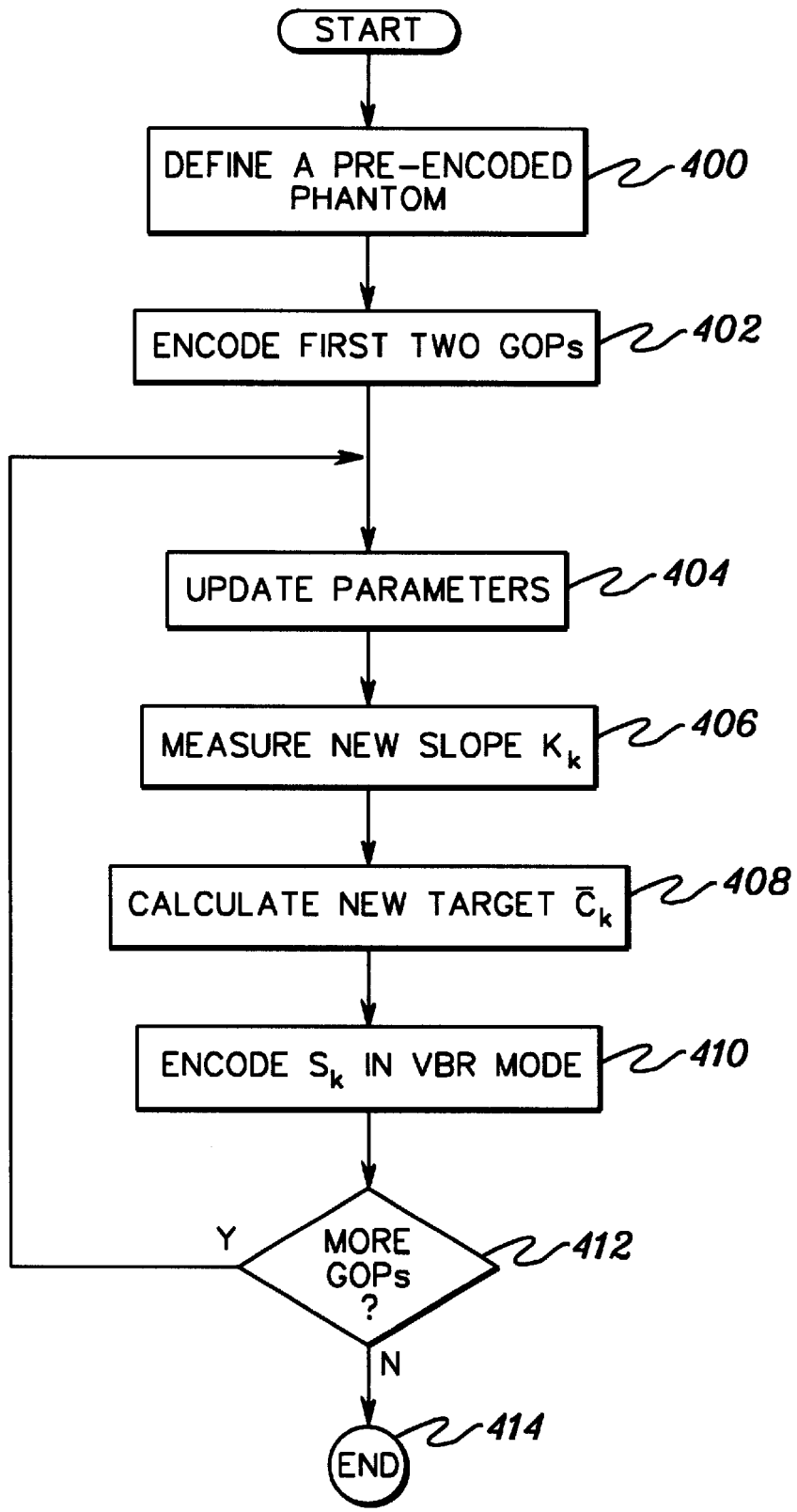
FIG. 4 depicts one embodiment of the logic associated with one example of estimating the number of bits to be allocated to a group of pictures (GOP), in accordance with the principles of the present invention.

Since K, and in particular, the denominator of K cannot be computed in a single pass VBR encoding scheme, a technique has been devised, in accordance with the principles of the present invention, to modulate K and to estimate the number of bits to be allocated to each GOP. This real-time single pass VBR scheme is referred to as a learning procedure, because it learns certain information as it progresses. One embodiment of the learning procedure is described below with reference to FIG. 4:

1. Let P be a pre-encoded phantom defined by the tuple:

$$\left\{N_{gop}^*, \{\overline{Q}_k^*\}_{k=0}^{N_{gop}^*-1}\right\}, \text{ and}$$

$$\text{set } Z_0 = \left(\sum_{k=0}^{N_{gop}^*-1} F(\overline{Q}_k^*)\right), \text{ and } N_0 = N_{gop}^*, \text{ Step 400.}$$

A typical value for $Z_0$ is 108 and for $N_0$ is 114.

2. Initialize the VBR rate control technique by encoding the first two GOP's of the input sequence, i.e, $S_0$ and $S_1$, at a rate of $f \cdot \overline{C}_{gop}$ using, for instance, a CBR MPEG-2 encoder. The nominal value of $f \cdot \overline{C}_{gop}$ should correspond to the average rate of the VBR stream given by the user, STEP 402.

3. After $S_{k-1}$ is encoded, various parameters are updated, STEP 404. For instance, $Z_k$, which represents a summation of the measures of encoding difficulty, and $N_k$, which is the adjusted number of GOP's, are updated as: $Z_k = Z_{k-1} + \gamma F(\overline{Q}_{k-1,actual})$, $N_k = N_{k-1} + \gamma$, where $\gamma$ is the update speed of the learning algorithm (e.g., $\gamma = 2.0$). Additionally, $C_{k-1,actual}$ is computed, as well as the sum $$\sum_{j=0}^{k-1} C_{j,actual}.$$

(a) If (k−1=0)=> increment k by one, go to Step 3.
(b) Otherwise, compute other parameters, such as $\xi_k$ and $\eta_k$, according to the predictive model defined in equation (10).

4. Use the sum term of Step 3 to determine the remaining bits $R_{k,tot}$ in the budget. For instance, subtract $$\sum_{j=0}^{k-1} C_{j,actual}$$

from $R_{tot}$ to obtain $R_{k,tot}$. Update the number of remaining frames or pictures $P_k$ to be encoded, STEP 404.

5. Measure the new slope:

$$K_k = \frac{fR_{k,tot}N_k}{P_k Z_k}, \quad \text{STEP 406.}$$

6. Calculate new target $\overline{C}_k$ using equation (11), described above, or equation (14), described below, STEP 408.
7. Encode $S_k$ in VBR mode, STEP 410.
8. If there are unfinished GOP's in the sequence, INQUIRY 412, go to Step 3, otherwise stop, STEP 414.

The term $Z_k$ is intended to adapt itself to the image content of each GOP and smooth out the volatility of the VBR video. It acts as a safety measure to prohibit unrealistic bit-allocations to very high (low) complexity GOP's.

Described above is a scheme for determining the average bits of a GOP $S_k$ to be encoded. In summary, this target bits is set by the following equation:

$$\overline{C}_k = \left(\frac{R_{k,tot}N_k}{P_k Z_k}\right)\left(\frac{\xi_k a_1 + \eta_k a_2}{\xi_k + a_2\left(\frac{R_{k,tot}N_k}{P_k Z_k}\right)}\right). \quad (14)$$

The rate control technique of the present invention is further described below with reference to FIG. 5. In one embodiment, an uncompressed input stream (e.g., a video stream) is input into a compression engine 500, which includes, for instance, the encoder depicted in FIG. 1 and described above. Since there is no prior knowledge of the input stream, compression engine 500 is initialized with the old technology of the chip, i.e., a known CBR or VBR algorithm. Thereafter, the first two GOP's are encoded in, for instance, CBR mode.

Figure 5:
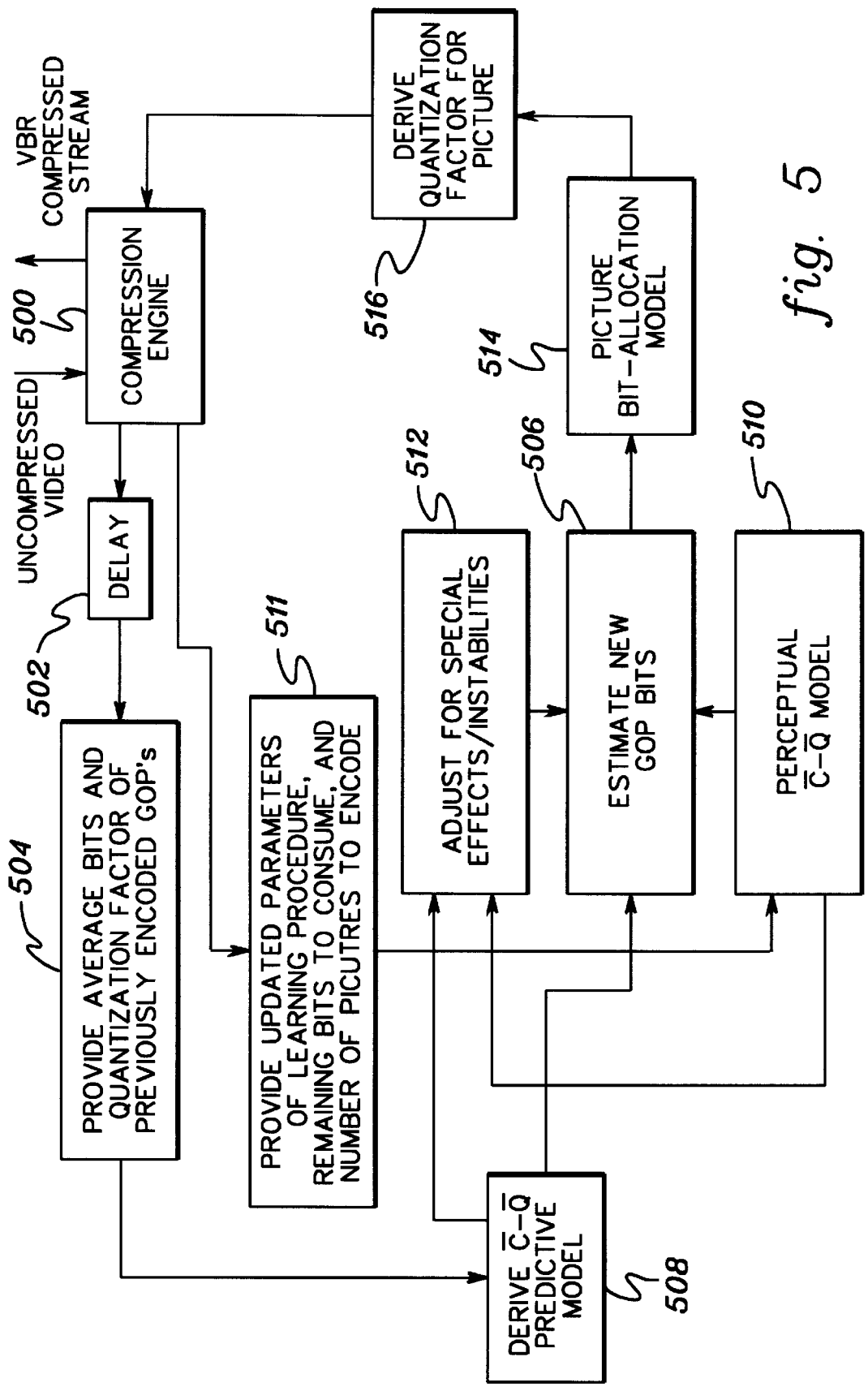
FIG. 5 depicts one example of a block diagram of one embodiment of the variable bit rate control strategy of the present invention.

A delay 502 is provided in FIG. 5 to illustrate that information is to be obtained from previously encoded GOP's (e.g., $GOP_{k-1}$ and $GOP_{k-2}$) and not from $GOP_k$, which is the next GOP to be encoded.

Thereafter, the average bits, $\overline{C}_1, \overline{C}_2$, for each of the last two encoded GOP's (e.g., $GOP_{k-1}$ and $GOP_{k-2}$), and the average Q factor, $\overline{Q}_1, \overline{Q}_2$, for those GOP's, are calculated (504). As an example, the manner in which the average bits and the average Q factor are calculated for the first two GOP's is described above with respect to equations 1 through 7. The values of $(\overline{C}_1, \overline{Q}_1), (\overline{C}_2, \overline{Q}_2)$ are then buffered to be used later to estimate the GOP bits needed for the next GOP to be encoded (e.g., $GOP_k$).

In order to estimate the new GOP bits (506), the $\overline{C}$-$\overline{Q}$ predictive model (508) of equation (10) and the $\overline{C}$-$\overline{Q}$ perceptual model (510) of equation (9a) are used in the estimation of the new GOP bits. As shown in FIG. 5, the updated parameters of the learning procedure, the remaining bits to consume and the number of pictures to encode are input to the time varying perceptual model (511). The point at which the predictive and perceptual models meet is the estimate of the GOP bits for $GOP_k$. This point is defined by previously described equation (14).

In addition to the above, the estimation of the GOP bits can be adjusted for special effects and instabilities (512), as described below.

After the new GOP bits are derived, a picture bit allocation model is used in order to assign a number of bits to each frame or picture of the GOP to be encoded (514). In one embodiment, in order to adjust the target bits of each picture type, $\overline{C}_k$ is multiplied by the GOP size G, and the following equation is used to obtain an ideal bits for each picture:

$$R^X_{n,ideal} = \frac{X^X_{n-1}(C_k - \alpha_1 \Delta_{n-1,gop} - \alpha_2 \Delta_{n-1,pic})}{\sum_x X^X_{n-1} N^x}. \quad (15)$$

For a CBR type of operation, the same amount of bits per GOP are to be consumed and, if there are differences between ideal GOP target bits and actual values, the long term GOP errors are carried over to the next GOP to be encoded. This is so that the bit rate of the video stream for a GOP, or for a collection of GOP's, or for the whole sequence, would be the same. The long term GOP error is $\Delta_{n-1,gop}$. However, for a real-time VBR scenario, there is no need to carry over the long term GOP errors, since each GOP may operate at a different bit rate. The responsibility of the VBR scheme is to optimize the total bit budget for video quality. With the parameter $\alpha_1$ in the above equation, one can scale the long term GOP errors and control this information as it is fed to the rate-control algorithm of the VBR encoder. Once the VBR GOP target bits are set, $\alpha_2$ is used to meet the bit budget within the GOP. Typical values for $\alpha_1$ and $\alpha_2$ are 0.05 and 0.2, respectively.

For example, set the CBR rate at 4.0 Mbits/sec and encode the first GOP. Assume 3.9 Mbits/sec is consumed. The remaining 0.1 Mbits/sec goes to the next GOP (number 2) and it will get 4.1 Mbits/sec (ideally). But, if GOP 2 only gets 3.5 Mbits/sec, then, for the first two GOP's, there was an undershoot by 0.6 Mbits/sec, which carries over to GOP 3 to ensure a piece-wise constant bit rate. This is not needed for VBR, as we are trying to optimize video quality for regions where CBR is vulnerable. The surplus bits (0.6 Mbits/sec) should be conserved and be used efficiently for difficult (hard) to encode scenes. This is why $\alpha_1$ is very small.

After the ideal bits for the pictures are determined, the quantization factor for each picture is also derived (516) using, for instance, equation (1). This quantization factor is input to compression engine 500, which is used to compress each of the frames or pictures of the current GOP. The output of the compression engine is a stream compressed in a single pass real-time variable bit rate mode, in accordance with the principles of the present invention.

Subsequent to encoding the frames, the actual number of bits allocated to each picture can be obtained from, e.g., a counter within compression engine 500. These values can then be plugged into equation (6) to determine how far the actual bits deviated from the ideal bits.

In FIG. 5, the various processes used to estimate the number of GOP bits are shown separately from compression engine 500. That is, processing logic or circuits independent of compression engine 500 can be used to implement the processes. However, in another embodiment, one or more of the processes of FIG. 5 can be included on one chip (i.e., within compression engine 500).

The single pass VBR rate-quantization framework described above is based on an assumption that a decoder buffer within a decompression engine is of an infinite size and that a large enough number of bits is always available. However, in a real-life scenario, the buffer size is limited and defined by the MPEG-2 standard. Thus, the encoding scheme of the present invention is responsible for eliminating any overflow or underflow condition that the decoder buffer may encounter. This is accomplished by examining a hypothetical decoder buffer, i.e., a video buffer verifier (VBV), and computing lower/upper bounds on the amount of bits assigned for a picture type. Fortunately, for a VBR scenario, an overflow cannot occur for the decoder buffer. This is because the task of filling the decoder buffer is immediately stopped after the VBV buffer occupancy reaches its maximum level. Therefore, a lower bound of zero is imposed for picture bound. Moreover, the decoder buffer is filled at the maximum rate of $R_{max}$ (in Mbits/sec), set by the user.

However, an underflow condition can occur for the VBV buffer of a VBR decoder, and an upper bound not larger than a pre-determined value should be assigned to prevent this. Thus, let $B_n$ and $B_n^*$ be the decoder buffer fullness before and after picture n is removed, respectively. $B_n^*$ is computed as:

$$B_n^* = B_n - R_{n,actual} \quad (16).$$

Further, the buffer fullness before removing the next picture is, $$B_{n+1} = \text{MIN}(B_{vbv}, B_n^* + R_{max} T_n) \quad (17),$$

where $B_{vbv}$ is the total size of the video buffer verifier and $T_n$ is the display period for picture n. ($T_n$ is an inverse of f.) Before picture n is removed, all of the information in the buffer is available, and therefore, the upper bound $U_n$ becomes the buffer occupancy. The nominal values by which the picture target bits is bounded are given by the lower bound $L_n$ and upper bound $U_n$:

$$U_n = \text{MIN}(B_{vbv}, B_{n-1} + R_{max} T_{n-1} - R_{n-1,actual})$$

$$L_n = 0 \quad (18).$$

Therefore, the ideal picture bits are clipped, using the picture bounds:

$$R_{n,ideal} = \begin{cases} U_n & \text{if } (R_{n,ideal} > U_n) \\ L_n & \text{elseif } (R_{n,ideal} < L_n) \\ R_{n,ideal} & \text{else.} \end{cases} \quad (19)$$

Described above is a single pass VBR MPEG-2 encoder specified by $\{R_{TOT}, \{R_i, Q_i\}^n_{i=0}\}$. The encoder operates along constellations which are formed by jointly solving for a time-varying perceptual model and a bank of ($\overline{C}$-$\overline{Q}$) models. The relative ideal position of a ($\overline{C}_k, \overline{Q}_k$) pair of a GOP within the constellation is first determined by the "softness" or "hardness" of the GOP and then adjusted by the remaining number of bits in the bit budget. The local position of the ($R_i, Q_i$) pair of a picture is represented by the (R-Q) model of the picture type. FIG. 3 displays how a constellation of $(\overline{C}_k,\overline{Q}_k)$ pairs is formed by the VBR encoder, which employs the variable bit rate control technique 1. In this figure, the constant line defined by $\overline{C}=\overline{C}_{gop}$ indicates the ideal location of all $(\overline{C}_k,\overline{Q}_k)$ pairs if they were to be encoded in CBR mode. Moreover, the figure reflects that the average quantization scalers increase as the hardness of GOP's increase. Ideal and actual operating points are depicted by white and dark circles, respectively. Let $(\overline{C}_1,\overline{Q}_1)$ and $(\overline{C}_2,\overline{Q}_2)$ be the first two pairs of a "soft" GOP, which are obtained by initialization of the VBR encoder in the beginning of a video sequence. The next ideal operating point, denoted by "3", is the intersection of the perceptual model (solid line) and the causal predictive model. The position of point "3" indicates that an average bits smaller than the sequence average bits $\overline{C}_{gop}$ is allocated. However, the output of the encoder, i.e., point $(\overline{C}_3,\overline{Q}_3)$, will be different, and as a result, a new perceptual model (shown by dotted line) is derived to meet the bit budget constraint. The pairs $(\overline{C}_2,\overline{Q}_2)$ and $(\overline{C}_3,\overline{Q}_3)$ are then used to obtain a new predictive model (displayed by dotted line) and compute a new operating point, i.e., "4". If the video sequence contains a large number of contiguous "soft" GOP's, the perceptual model will eventually converge to a line which intersects the $\overline{C}=\overline{C}_{gop}$ line in close proximity to the CBR output pairs $(\overline{C}_1,\overline{Q}_1)$ and $(\overline{C}_2,\overline{Q}_2)$.

If the video material starts with "hard" GOP's, the location of the actual point $(\overline{C}_3,\overline{Q}_3)$ is above the $\overline{C}=\overline{C}_{gop}$ line. This ensures the optimization of the available bit budget for regions where a CBR encoder is most vulnerable, i.e., "hard" GOP's. In this scenario, a new perceptual model (displayed by dashed line) is formed to gradually lower the allocated GOP bits and comply with the bit budget constraint. This model, along with the new causal predictive model (shown also by dashed line), determine the next operating point, denoted by "4". For the case where the incoming sequence is composed only of "hard" GOP's, the perceptual model will eventually conform to a line which meets the $\overline{C}=\overline{C}_{gop}$ line at a location close to $(\overline{C}_1,\overline{Q}_1)$ and $(\overline{C}_2,\overline{Q}_2)$ points. For a typical video program, it is unlikely that we operate along the same GOP (or a constellation of previously computed points) for a long duration of time. It is, however, likely that we jump out of a GOP to the next neighboring GOP after a short time. Therefore, we can deduce the following behavior. Before the perceptual model settles in a situation where it can monotonously take away from "hardness" or "softness" of a GOP, the rate control technique will migrate to a new GOP. The actual quantization scaler values for previously encoded picture types determine the migration to a "harder" or "softer" GOP. For a future "harder" ("softer") GOP, we move to the right (left) of the previously encoded GOP, as depicted in FIG. 3. Hence, where we intersect the perceptual model produces a GOP bits which is higher (lower) than the actual bits consumed by a previous GOP. This mechanism ensures that for a collection of contiguous GOP's of similar "level of encoding difficulty" the effect of the "hardness" (or "softness") reduction or augmentation is distributed over the encoded content of the corresponding video interval, while the most (least) complex GOP still gets the largest (smallest) bit allocation relative to its look-alike GOP's. While this technique is based on modulating the slope K of the perceptual model, an alternative VBR rate control technique can be formulated by translation of the perceptual model to meet the total number of bits set by the user. This variable bit rate control technique is described next.

2.3 VBR Rate Control Technique 2

In this section, a second technique for calculating the target bits of each GOP to be encoded is described. In accordance with the principles of the present invention, instead of modulating slope K of the $(\overline{C}\text{-}\overline{Q})$ perceptual model, the position of the perceptual model is translated by solving for parameter $a_1$. Slope K is fixed at a CBR rate of $f \cdot \overline{C}_{gop}$ and parameter $a_1$ is derived as follows:

$$a_1 = \frac{R_{TOT} - C_{gop}a_2 \sum_{k=o}^{N_{gop}-1} \overline{Q}_k}{C_{gop}N_{gop}}. \quad (20)$$

The sum term in the above equation is undefined for a real-time single pass VBR encoder. Thus, a pre-encoded phantom sequence (as in technique 1) is used to initialize VBR rate control technique 2 of the present invention. To ensure that the digital storage medium does not experience over-runs/under-runs, the remaining bits are monitored periodically and used as the instantaneous total bit budget, i.e., $R_{k,tot}$. Translation of the perceptual model is varied as:

$$a_1^k = \frac{P_k^{-1} R_{k,tot}}{\overline{C}_{gop}} - a_2 \frac{Y_k}{N_k} = r_a^k - a_2 E_k, \quad (21)$$

where term $r_a^k$ represents a ratio between the long term rate of the GOP's not yet encoded and a CBR rate of the video stream, and $Y_k$ and $E_k$ are described below. For hard GOP's, $(\overline{C}_k > \overline{C}_{gop})$ and, therefore, ratio $r_a$ has to become smaller over time to satisfy the total bit budget. Further enforcement is provided by $E_k$ to move the position of the $(\overline{C}_k,\overline{Q}_k)$ pairs downstream, along the constellation, to lower the rate of the compressed stream. The opposite scenario takes place if several soft GOP's are encoded over time. The average bits of each GOP is set as follows:

$$\overline{C}_k = \frac{\xi_k a_1^k + \eta_k a_2}{\xi_k \overline{C}_{gop}^{-1} + a_2}. \quad (22)$$

In accordance with the principles of the present invention, a learning procedure is also provided for VBR rate control technique 2. During this learning procedure, Y is initialized and updated. The remaining encoding parameters are defined with the formulation of VBR rate-control technique 1.

Figure 6:
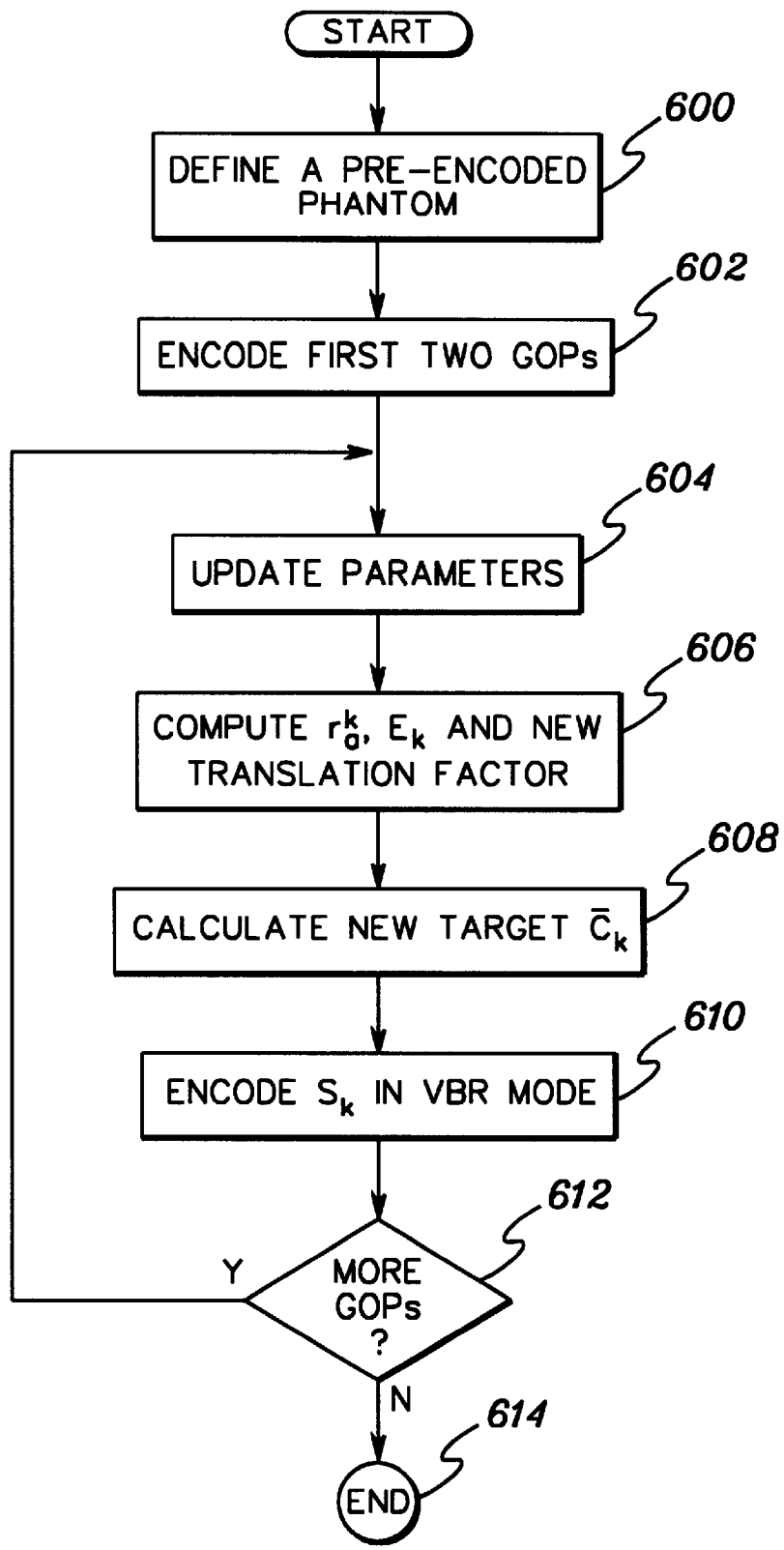
FIG. 6 depicts one embodiment of the logic associated with another example of estimating the number of bits to be allocated to a group of pictures, in accordance with the principles of the present invention.

One embodiment of learning procedure 2 is described below with reference to FIG. 6.

1. Let P be a pre-encoded phantom defined by the tuple $$\left\{ N_{gop}^*, \{\overline{Q}_k^*\}_{k=0}^{N_{gop}^*-1} \right\},$$

and set $$\overline{Y}_0 = \left( \sum_{k=0}^{N_{gop}^*-1} \overline{Q}_k^* \right),$$

and $N_0 = N_{gop}^*$, STEP 600.

A typical value for $Y_0$ is 1869.

2. Initialize the VBR rate control technique by encoding the first two GOP's of the video sequence, i.e., $S_0$ and $S_1$, at a rate of $f \cdot \overline{C}_{gop}$ using, for example, a CBR MPEG-2 encoder. The nominal value of $f \cdot \overline{C}_{gop}$ should correspond to the average rate of the VBR stream, STEP 602.

3. After $S_{k-1}$ is encoded, update various parameters, STEP 604. For instance, update $Y_k$, which represents a summation of average quantization factors per group of frames, and $N_k$ as: $Y_k = Y_{k-1} + \gamma \overline{Q}_{k-1,actual}$, and $N_k = N_{k-1} + \gamma$, respectively, where $\gamma$ is the update speed of the learning algorithm (e.g., $\gamma = 2.0$). Compute $C_{k-1,actual}$, and then, the sum of $$\sum_{j=0}^{k=1}$$

$C_{j,actual}$.

(a) If (k−1 =0)=> increment k by one, go to Step 3.
(b) Otherwise, compute $\xi_k$ and $\eta_k$ according to the predictive model defined in equation (10).

4. Use the sum term of Step 3 to determine the remaining bits $R_{k,tot}$ in the budget. Update the number of remaining pictures $P_k$ to be encoded, STEP 604.
5. Compute $r_a^k$, $E_k$ and the new translation factor $a_1^k$, STEP 606.
6. Calculate new target $\overline{C}_k$ using, for instance, equation (22), STEP 608.
7. Encode $S_k$ in VBR mode, STEP 610.
8. If there are unfinished GOP's in the sequence, INQUIRY 612, go to Step 3, otherwise stop, STEP 614.

Figure 7:
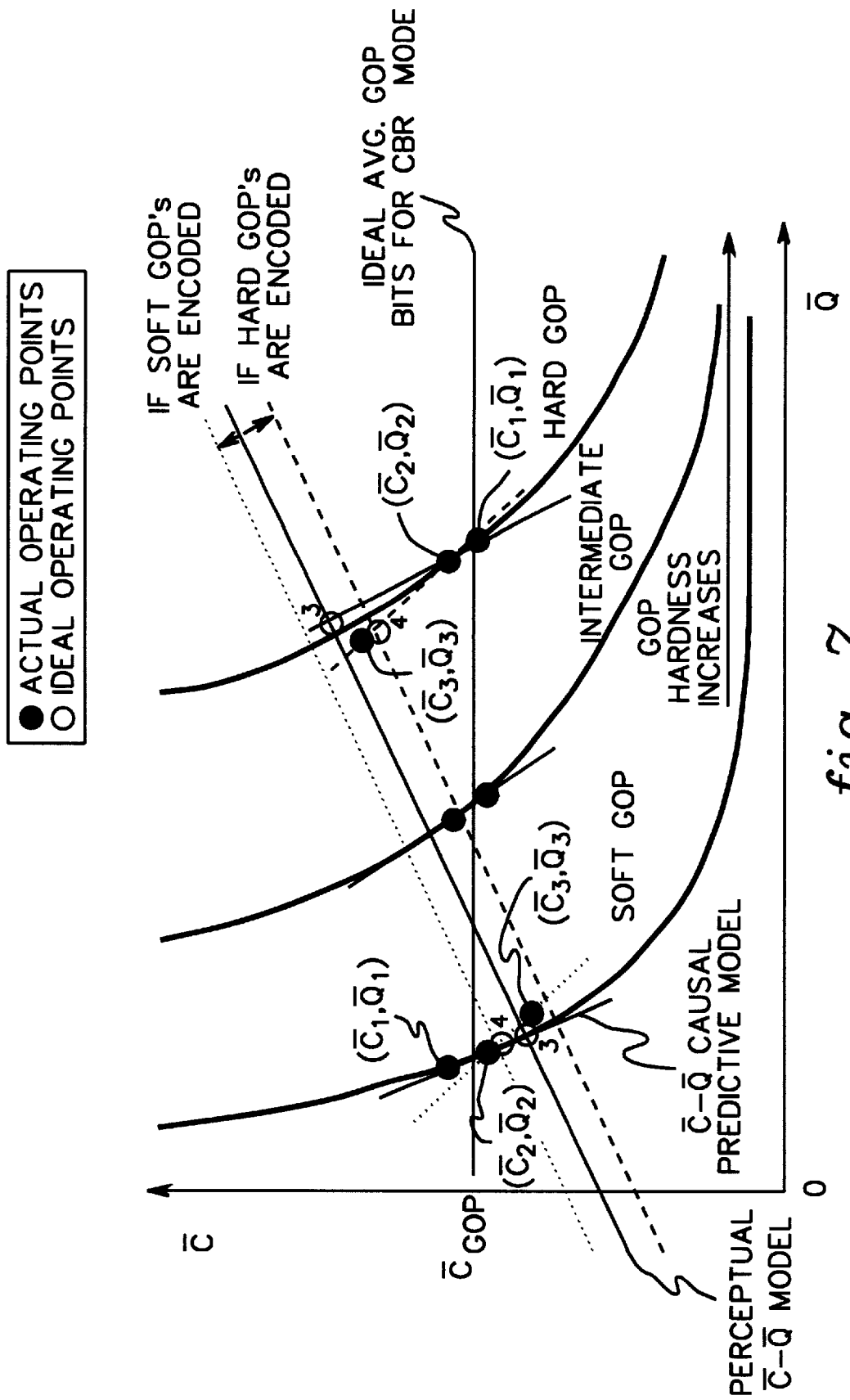
FIG. 7 depicts one example of the $\overline{C}$-$\overline{Q}$ models and the operating points of another variable bit rate control technique of the present invention.

Constraints on the VBV buffer occupancy and target adjustments are handled as described in the previous sections. FIG. 7 displays how the instantaneous causal predictive models are formed within each GOP and used in conjunction with a time-varying perceptual model to estimate a new ($\overline{C}_k, \overline{Q}_k$) point for the VBR encoder which employs the variable bit rate control technique 2. If several soft (or hard) COP's are encoded over time, the perceptual model will be shifted upward (or downward) to meet the bit budget constraint.

2.4 Scene Transitions

During the course of the encoding procedure, the VBR rate control technique can become unstable. The cause of this is usually special effects or naturally occurring phenomena, such as scene cuts, slow or fast moving fades (e.g., fade from old scene to black to new scene), and sudden luminance changes (as a result of high intensity light from camera, gun shot in an action movie, etc.) in combination with the volatility nature of the compressed video parameters. For the aforementioned temporal and spatial transitions, the parameter adjustments for the encoder become nearly impossible.

In accordance with the principles of the present invention, high quality video VBR streams are offered, even when special effects are compressed. This is accomplished by detecting algorithmic instabilities of the VBR encoder (as a result of the special effects) and setting the GOP targets along a trajectory different than the procedures described in previous sub-sections.

Figure 8:
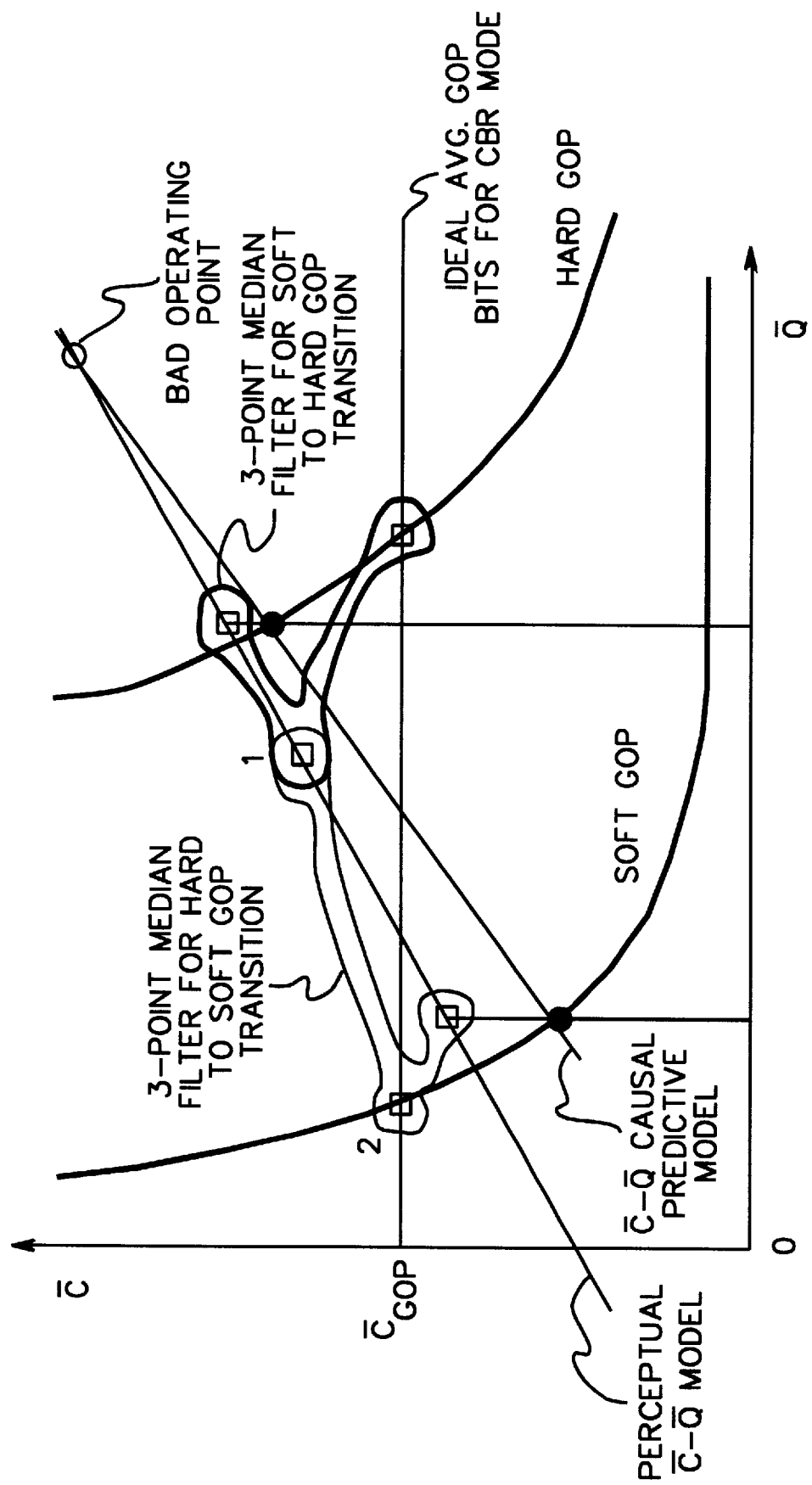
FIG. 8 depicts one example of GOP bits adjustment during a scene transition using a MEDIAN filtering technique of the present invention.

FIG. 8 depicts a case where a transition from a soft GOP to a hard GOP makes an incorrect estimation for a future GOP to be encoded. This incorrect estimation is denoted by "bad operating point" in the figure. A much better estimation can be made by applying a 3-point MEDIAN filter to a set of carefully selected parameters.

For example, for VBR rate control technique 1, the new targets are derived using the following:

$$C_{k,new} = G \cdot \begin{cases} \text{MEDIAN}(\mu_1 f^{-1} K_k F(\overline{Q}_{k-1,actual}), \mu_2 \overline{C}_{gop}, \mu_3 f^{-1} K_k) & \text{if } (\xi_k < 0) \\ \overline{C}_k & \text{else} \end{cases} \quad (23)$$

As a further example, for VBR rate control technique 2, the new targets are derived using:

$$C_{k,new} = G \cdot \begin{cases} \text{MEDIAN}\left(\mu_1 \frac{r_a^k \overline{C}_{gop} F(\overline{Q}_{k-1,actual})}{a_2 E_k + H(k)}, \mu_2 \overline{C}_{gop}, \mu_3 \frac{r_a^k \overline{C}_{gop}}{a_2 E_k + H(k)}\right) & \text{if } (\xi_k < 0) \\ \overline{C}_k & \text{else} \end{cases} \quad (24)$$

where $H(k) a_1(N_{gop}^* + \gamma k) N_k^{-1}$.

The MEDIAN filter is used to compensate for instability conditions (as a result of scene transitions) that may occur in all types of GOP's, e.g., soft or hard. The constant set $\{\mu_1, \mu_2, \mu_3\}$ enforces a bound on the number of bits produced during a scene transition. In one example, $\mu_1 = 1.0$, $\mu_2 = 0.9$ and $\mu_3 = 0.9$.

The GOP target allocation of equations (23) and (24) can also be used when scene changes are detected. How to detect the scene cut is not described herein, since many techniques of scene change detection are given in the literature. Since the encoding of each GOP starts with an I picture, if the position of this picture is where the scene cut occurs in the sequence, then equation (23) or equation (24) is used to set the new target. Moreover, if the encoder detects a scene change for a P picture, this type of picture is changed to an I type and a new GOP is started and, again, the new target is set according to equation (23) or equation (24).

2.5 ($\overline{C}$-$\overline{Q}$) Instabilities

The (R-Q) relationship of equation (1) is known to work fairly well for a diverse class of video sequences and is a fundamental concept used for many real-time MPEG and non-MPEG compression systems. In accordance with the principles of the present invention, however, this relationship is used to build a causal predictive model to estimate the average bits of a present GOP to be encoded, based on the actual average GOP bits and average quantization factor of previous GOP's. However, this predictive model can become unreliable for some video segments, even when there are no special effects, scene transitions, or scene cuts. The cause of this is related to the non-stationary nature of video sources, e.g., several highly detailed objects moving slowly across a background of significant luminance or chrominance image details, presence of unwanted noise in the scene, etc.

Figure 9:
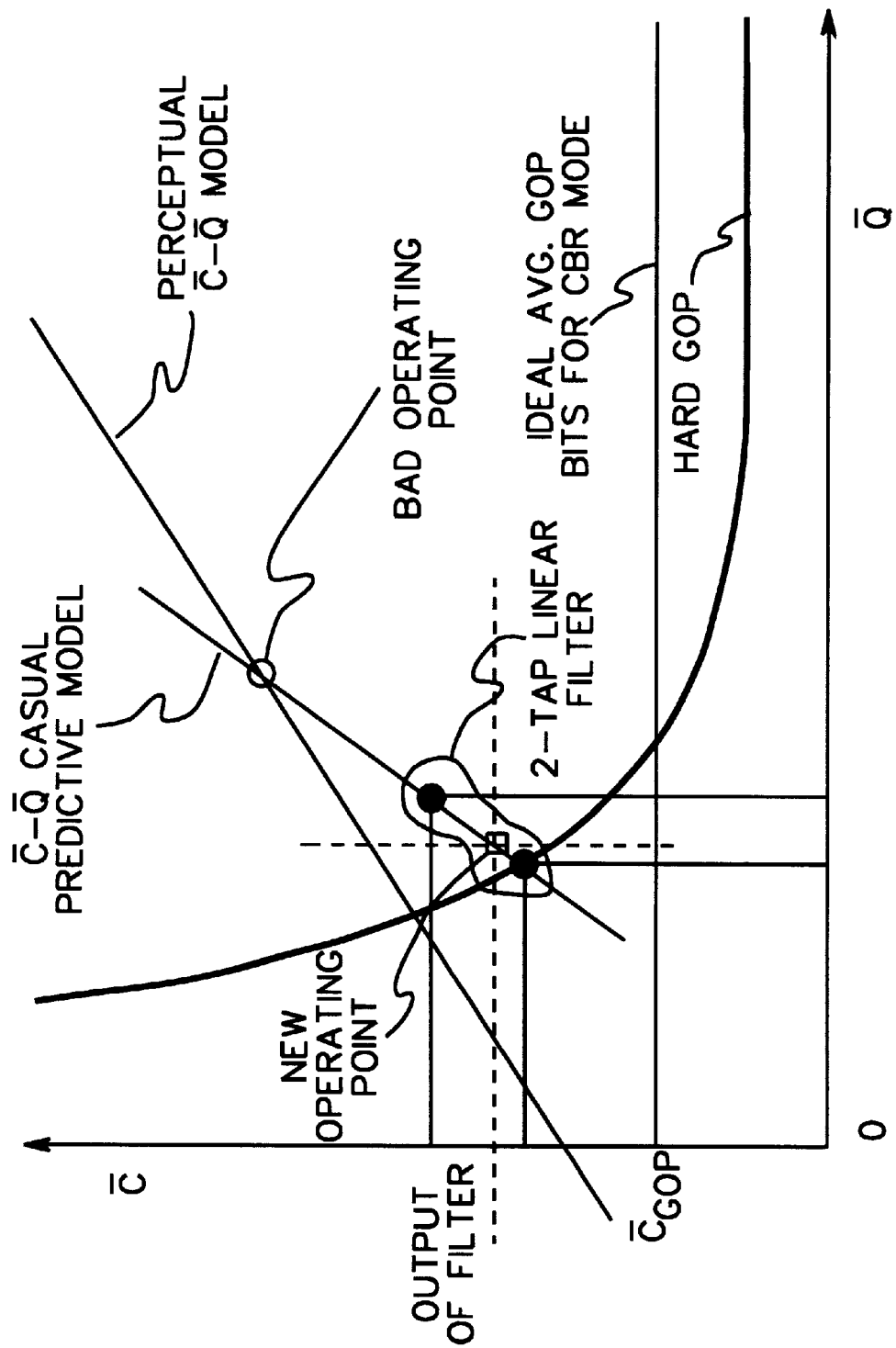
FIG. 9 depicts one example of GOP bits adjustment for rate control instabilities, in accordance with the principles of the present invention.

FIG. 9 displays two points derived by an encoder with one being outside of the composite ($\overline{C}$-$\overline{Q}$) curve. This point is a result of the aforementioned criteria and does not obey the ($\overline{C}$-$\overline{Q}$) relationship. Further, it contributes to calculation of a "bad operating point." The VBR encoder of the present invention suppresses this instability by making an additional contribution to the strategy defined in equation (23) or equation (24). In particular, the GOP bits are set according to the condition below:

$$C_{k,new} = \begin{cases} MAX(C_{k,new}, G\Phi_{max}\overline{C}_{k,fil}) & \text{if}(\xi_k < 0) \wedge (\theta_L < |\Delta\overline{Q}| < \theta_U) \wedge (\overline{C}_{k,fil} > \overline{C}_{gop}) \\ MIN(C_{k,new}, G\Phi_{min}\overline{C}_{k,fil}) & \text{elseif}(\xi_k < 0) \wedge (\theta_L < |\Delta\overline{Q}| < \theta_U) \wedge (\overline{C}_{k,fil} < \overline{C}_{gop}) \\ G\overline{C}_{gop} & \text{elseif}(\xi_k < 0) \wedge (\theta_L < |\Delta\overline{Q}| < \theta_U) \wedge (\overline{C}_{k,fil} = \overline{C}_{gop}) \end{cases} \quad (25)$$

with, $$\overline{C}_{k,fil} = \frac{\omega_1 \overline{C}_{k-2,actual} + \omega_2 \overline{C}_{k-1,actual}}{\omega_1 + \omega_2}, \quad (26)$$

where $\omega_1$ and $\omega_2$ represent the weights of the filter. In one example, $\omega_1=1.0$ and $\omega_2=1.0$, and in another example, $\omega_1$ is set to 1.0 and $\omega_2$ is set to 3.0.

In the above equation, $\Phi$ is a constant used to modulate the number of bits to be allocated. For example, MAX $\Phi$ is 1.1 and MIN $\Phi$ is 0.9. Thresholds $\theta_{L \ (e.g., \ 0.1)}$ and $\theta_U$ (e.g., 1.0) are chosen under the assumption that a future GOP belongs to the same video segment as the already processed GOP's, and $\overline{C}_{k,fil}$ is an average GOP bits, which is determined by applying a linear filter on the bits of the previously encoded GOP's. Output of this linear filter is the new operating point. The MAX and MIN functions are implemented to filter out the encoding bit parameters that result in ($\overline{C}$-$\overline{Q}$) instabilities.

Described in detail above are techniques for providing a real-time single pass variable bit rate encoder that is easy to implement and produces high quality video. An estimate of the number of bits to be allocated to a GOP is determined, and then the estimate is refined using various techniques.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of processing groups of frames, said method comprising:

encoding at least one group of frames of an input stream;

determining, prior to encoding the entire input stream, a number of bits to be allocated to another group of frames of said input stream, said another group of frames to be encoded in a self-variable bit rate mode, and wherein said determining uses one or more parameter values obtained from said encoding; and encoding said another group of frames in a single pass variable bit rate mode, wherein said another group of frames is encoded in only one encoding pass;

wherein said encoding said another group of frames comprises adjusting an ideal number of target bits of a picture type, within said another group of frames, wherein said adjusting comprises scaling a sub-error accumulation of previously encoded groups of frames of said input stream using a first scaling factor and scaling a sub-error accumulation of frames of said another group of frames using a second scaling factor.

2. The method of claim 1, wherein said first scaling factor is smaller than said second scaling factor.

3. A method of processing groups of frames, said method comprising:

encoding at least one group of frames of an input stream; and determining, prior to encoding the entire input stream, a number of bits to be allocated to another group of frames of said input stream, said another group of frames to be encoded in a self-variable bit rate mode, and wherein said determining uses one or more parameter values obtained from said encoding;

wherein said determining comprises:

modulating, for said another group of frames, a slope of a predefined perceptual function; and using said modulated slope in a bit rate equation to determine said number of bits.

4. The method of claim 3, wherein said predefined perceptual function comprises:

$$\overline{C}_k = f^{-1} K F(\overline{Q}_k)$$

wherein $F(\overline{Q}_k) = a_1 + a_2 \overline{Q}_k^\beta$ in which, $a_1$, $a_2$ and $\beta$ are constants, $\overline{Q}_k$ is a quantization factor, and K represents a slope value.

5. The method of claim 3, wherein said bit rate equation comprises:

$$\overline{C}_k = \left(\frac{R_{k,tot} N_k}{P_k Z_k}\right) \left(\frac{\xi_k a_1 + \eta_k a_2}{\xi_k + a_2\left(\frac{R_{k,tot} N_k}{P_k Z_k}\right)}\right),$$

wherein $R_{k,tot}$ represents a number of remaining bits in a bit budget, $N_k$ represents an adjusted number of groups of frames in an input stream, $P_k$ represents a number of remaining frames of said another group of frames to be encoded, $Z_k$ represents a summation of the measures of encoding difficulty, $\xi_k$ is $\Delta\overline{C}_k/\Delta\overline{Q}_k$ in which $\overline{C}_k$ is an average bits and $\overline{Q}_k$ is an average quantization factor, $\eta_k$ is equal to $\overline{C}_{k-1,actual} + \xi_k \overline{Q}_{k-1,actual}$, and $a_1$ and $a_2$ are constants.

6. A method of processing groups of frames, said method comprising:

encoding at least one group of frames of an input stream; and determining, prior to encoding the entire input stream, a number of bits to be allocated to another group of frames of said input stream, said another group of frames to be encoded in a self-variable bit rate mode, and wherein said determining uses one or more parameter values obtained from said encoding;

wherein said determining comprises:
determining, for said another group of frames, a translation factor for a predefined perceptual function; and using said translation factor in a bit rate equation to determine said number of bits.

7. The method of claim 6, wherein said determining said translation factor comprises using:

$$a_l^k = \frac{P_k^{-1} R_{k,tot}}{C_{gop}} - a_2 \frac{Y_k}{N_k},$$

wherein $P_k$ represents a number of remaining frames of said another group of frames to be encoded, $R_{k,tot}$ represents a number of remaining bits in a bit budget, $C_{gop}$ is a rate of said input stream, $Y_k$ represents a summation of average quantization factors per group of frames, $N_k$ represents an adjusted number of groups of frames in an input stream, and $a_2$ is a constant.

8. The method of claim 1, wherein said determining comprises compensating for one or more instability conditions of said input stream, wherein said one or more instability conditions comprises at least one or a scene transition, a scene cut and one or more special effects, and wherein said compensating comprises applying a MEDIAN filter to one or more selected attributes of a predefined function used to determine said number of bits.

9. A method of processing groups of frames, said method comprising:
determining a plurality of parameter values from one or more previously encoded group of frames;
computing, for a group of frames to be encoded in a single pass variable bit rate mode, a slope of a predefined function, said computing using one or more of said plurality of parameter values; and
obtaining a bit rate for said group of frames to be encoded using said computed slope and one or more of said plurality of parameter values.

10. The method of claim 9, further comprising encoding said group of frames to be encoded in said variable bit rate mode at said bit rate obtained for said group of frames to be encoded.

11. The method of claim 10, further comprising repeating said determining, computing, obtaining and encoding for other groups of frames of said input stream.

12. The method of claim 11, wherein said determining, for each group of frames to be encoded, comprises using data from the last two groups of encoded frames.

13. The method of claim 9, wherein said computing said slope comprises using the following function:

$$K_k = \frac{f R_{k,tot} N_k}{P_k Z_k},$$

wherein f is a frame rate of said input stream, $R_{k,tot}$ is a remaining number of bits in a bit budget, $N_k$ represents an adjusted number of groups of frames in an input stream, $P_k$ represents a number of remaining frames of said another group of frames to be encoded and $Z_k$ represents a summation of the measures of encoding difficulty.

14. The method of claim 9, wherein said obtaining comprises using a predefined function to obtain said bit rate.

15. The method of claim 14, wherein said predefined function comprises:

$$\overline{C}_k = \left(\frac{R_{k,tot} N_k}{P_k Z_k}\right)\left(\frac{\xi_k a_1 + \eta_k a_2}{\xi_k + a_2\left(\frac{R_{k,tot} N_k}{P_k Z_k}\right)}\right),$$

wherein $R_{k,tot}$ represents a number of remaining bits in a bit budget, $N_k$ represents an adjusted number of groups of frames in an input stream, $P_k$ represents a number of remaining frames of said another group of frames to be encoded, $Z_k$ represents a summation of the measures of encoding difficulty, $\xi_k$ is $\Delta \overline{C}_k / \Delta \overline{Q}_k$ in which $\overline{C}_k$ is an average bits and $\overline{Q}_k$ is an average quantization factor, $\omega_k$ is equal to $\overline{C}_{k-1,actual} + \xi_k \overline{Q}_{k-1,actual}$, and $a_1$ and $a_2$ are constants.

16. The method of claim 14, wherein said predefined function represents an instantaneous rate-quantization behavior of said another group of frames and a perceptual model indicating a complexity of said another group of frames.

17. The method of claim 16, wherein said rate-quantization behavior is defined by:

$$\overline{C}_k = -\xi_k \overline{Q}_k \eta_k,$$

wherein $\overline{C}_k$ is an average bits, $\overline{Q}_k$ is an average quantization scaler, $\xi_k$ is equal to $\Delta \overline{C}_k / \Delta \overline{Q}_k$ in which $\Delta \overline{C}_k = \overline{C}_{k-1,actual} - \overline{C}_{k-2,actual}$, and $\Delta \overline{Q}_k = \overline{Q}_{k-2,actual} - \overline{Q}_{k-1,actual}$, and $\eta_k = \overline{C}_{k-1,actual} + \xi_k \overline{Q}_{k-1,actual}$.

18. The method of claim 16, wherein said perceptual model is defined by:

$$\overline{C}_k = f^{-1} K F(\overline{Q}_k)$$

wherein $F(\overline{Q}_k) = a_1 + a_2 \overline{Q}_k^\beta$ in which, $a_1$, $a_2$ and $\beta$ are constants, $\overline{Q}_k$ is a quantization factor, and K represents a slope value.

19. The method of claim 9, wherein said determining comprises compensating for one or more instability conditions of said input stream.

20. A single pass self-variable bit rate encoder comprising:
an encoding engine adapted to encode at least one group of frames of an input stream; and
means for determining, prior to encoding the entire input stream, a number of bits to be allocated to another group of frames of said input stream, said another group of frames to be encoded in a self-variable bit rate mode, and wherein said means for determining uses one or more parameter values obtained from encoding said at least one group of frames,
wherein said means for determining comprises:
means for modulating, for said another group of frames, a slope of a predefined perceptual function; and
means for using said modulated slope in a bit rate equation to determine said number of bits.

21. A single pass self-variable bit rate encoder comprising:
an encoding engine adapted to encode at least one group of frames of an input stream; and
means for determining prior to encoding the entire input stream, a number of bits to be allocated to another group of frames of said input stream, said another group of frames to be encoded in a self-variable bit rate mode, and wherein said means for determining uses one or more parameter values obtained from encoding said at least one group of frames, wherein said means for determining comprises:
means for determining, for said another group of frames, a translation factor for a predefined perceptual function; and means for using said translation factor in a bit rate equation to determine said number of bits.

22. The encoder of claim 21 wherein said means for determining comprises means for compensating for one or more instability conditions of said input stream, wherein said one or more instability conditions comprises at least one of a scene transition, a scene cut and one or more special effects, and wherein said means for compensating comprises means for applying a MEDIAN filter to one or more selected attributes of a predefined function used to determine said number of bits.

23. A single pass variable bit rate encoder comprising:
means for determining a plurality of parameter values from one or more previously encoded group of frames;

means for computing, for a group of frames to be encoded in a single pass variable bit rate mode, a slope of a predefined function, said computing using one or more of said plurality of parameter values; and means for obtaining a bit rate for said group of frames to be encoded using said computed slope and one or more of said plurality of parameter values.

24. The encoder of claim 23, further comprising means for encoding said group of frames to be encoded in a variable bit rate mode at said bit rate obtained for said group of frames to be encoded.

25. The encoder of claim 23, wherein said means for obtaining comprises means for using a predefined function to obtain said bit rate.

26. The encoder of claim 25, wherein said predefined function represents an instantaneous rate-quantization behavior of said another group of frames and a perceptual model indicating a complexity of said another group of frames.

27. The encoder of claim 23, wherein said means for determining comprises means for compensating for one or more instability conditions of said input stream.

28. An article of manufacture, comprising:
at least one computer usable medium having computer readable program code means embodied therein for causing the processing of groups of frames, the computer readable program code means in said article of manufacture comprising:

computer readable program code means for causing a computer to encode at least one group of frames of an input stream; and computer readable program code means for causing a computer to determine, prior to encoding the entire input stream, a number of bits to be allocated to another group of frames of said input stream, said another group of frames to be encoded in a self-variable bit rate mode, and wherein said computer readable program code means for causing a computer to determine uses one or more parameter values obtained from said encoding;

wherein said computer readable program code means for causing a computer to determine comprises:
computer readable program code means for causing a computer to modulate, for said another group of frames, a slope of a predefined perceptual function; and computer readable program code means for causing a computer to use said modulated slope in a bit rate equation to determine said number of bits.

29. An article of manufacture, comprising:
at least one computer usable medium having computer readable program code means embodied therein for causing the processing of groups of frames, the computer readable program code means in said article of manufacture comprising:

computer readable program code means for causing a computer to encode at least one group of frames of an input stream; and computer readable program code means for causing a computer to determine, prior to encoding the entire input stream, a number of bits to be allocated to another group of frames of said input stream, said another group of frames to be encoded in a self-variable bit rate mode, and wherein said computer readable program code means for causing a computer to determine uses one or more parameter values obtained from said encoding;

wherein said computer readable program code means for causing a computer to determine comprises:
computer readable program code means for causing a computer to determine, for said another group of frames, a translation factor for a predefined perceptual function; and computer readable program code means for causing a computer to use said translation factor in a bit rate equation to determine said number of bits.

* * * * *

UNITED STATES PATENT AND TRADEMARK OFFICE
CERTIFICATE OF CORRECTION

PATENT NO.    : 6,278,735 B1
DATED         : August 21, 2001
INVENTOR(S)   : Mohsenian It is certified that error appears in the above-identified patent and that said Letters Patent is hereby corrected as shown below:

Column 7,
Line 37, delete "Y:" and insert -- $\Upsilon$: --
Line 40, delete "Y = $\Psi$ - $\lambda C_k$" and insert -- $\Upsilon = \Psi - \lambda C_k$ --

Column 10,
Line 19, delete " $\{S_k\}^m{}_{k=0}$. *For GOP Sk,*" and insert -- $\{S_k\}^m_{k=0}$. For GOP $S_k$, --

Lines 19-20, delete "$\overline{C}_k \overline{Q}_k$" and insert -- $\overline{C}_k \overline{Q}_k$ --

Line 36, delete "$\overline{C}_k = -\xi_k \overline{Q}_k + \eta_k$" and insert -- $\overline{C}_k = -\xi_k \overline{Q}_k + \eta_k$ --

Column 12,
Line 20, delete "$R_{tot}$ to obtain $R_{k,tot}$." and insert -- $R_{TOT}$ to obtain $R_{k,tot}$. --
Line 59, delete "$\overline{C}_1, \overline{C}_2$" and insert -- $\overline{C}_1, \overline{C}_2$ --

Column 14,
Lines 37-38, delete " $B_{n+1} = MIN(B_{vb}r, B_n^* + R_{max}T_n)$" and insert
-- $B_{n+1} = MIN(B_{vbv}, B_n^* + R_{max}T_n)$ --

Column 16,
Line 28, delete " $r_a$ " and insert -- $r_a^k$ --

Lines 36-37, delete "$\overline{C}_k = \dfrac{\xi_k a_1^k + \eta_k a_2}{\xi_k \overline{C}_{gop}^{-1} + a_2}$" and insert -- $\overline{C}_k = \dfrac{\xi_k a_1^k + \eta_k a_2}{\xi_k \overline{C}_{gop}^{-1} + a_2}$ --

Line 61, delete "$N_0 = N_{gop}^*$." and insert -- $N_0 = N_{gop}^*$, --

Line 66, delete "$f\overline{C}_{gop}$should" and insert -- $f\overline{C}_{gop}$ should --

Column 18,
Line 26, delete "$H(k)a(N_{gop}^* + \gamma k)N_k^{-1}$," and insert -- $H(k)a(N_{gop}^* + \gamma k)N_k^{-1}$, --

Column 21,
Line 27, delete "or" and insert -- of --

UNITED STATES PATENT AND TRADEMARK OFFICE
CERTIFICATE OF CORRECTION

PATENT NO. : 6,278,735 B1
DATED : August 21, 2001
INVENTOR(S) : Mohsenian

It is certified that error appears in the above-identified patent and that said Letters Patent is hereby corrected as shown below:

Column 22,
Line 15, delete "$\omega_k$" and insert -- $\eta_k$ --

Line 25, delete "$\overline{C}_k = -\xi_k \overline{Q}k\eta_k$," and insert -- $\overline{C}_k = -\xi_k \overline{Q}k + \eta_k$, --

Line 35, delete "$F(\overline{Q}_k) = a_1 + a_2 \overline{Q}_k{}^\mu$" and insert -- $F(\overline{Q}_k) = a_1 + a_2 \overline{Q}_k^\beta$ --

Signed and Sealed this

Twenty-fifth Day of June, 2002

Attest:

JAMES E. ROGAN
Attesting Officer  Director of the United States Patent and Trademark Office